(12) United States Patent
Lee et al.

(10) Patent No.: US 11,650,414 B2
(45) Date of Patent: May 16, 2023

(54) OPTICAL STRUCTURE, CAMERA MODULE, AND ELECTRONIC DEVICE

(71) Applicant: Samsung Electronics Co., Ltd., Suwon-si (KR)

(72) Inventors: Jae Jun Lee, Suwon-si (KR); Mi Jeong Kim, Hwaseong-si (KR); Changki Kim, Suwon-si (KR); Hyung Jun Kim, Suwon-si (KR); Jong Hoon Won, Yongin-si (KR); Yong Joo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 767 days.

(21) Appl. No.: 16/693,753

(22) Filed: Nov. 25, 2019

(65) Prior Publication Data

US 2020/0301133 A1 Sep. 24, 2020

(30) Foreign Application Priority Data

Mar. 21, 2019 (KR) .................. 10-2019-0032555

(51) Int. Cl.
*G02B 27/00* (2006.01)
*G02B 5/22* (2006.01)
(Continued)

(52) U.S. Cl.
CPC .......... *G02B 27/0006* (2013.01); *B32B 27/08* (2013.01); *B32B 27/281* (2013.01); *B32B 27/285* (2013.01); *B32B 27/302* (2013.01); *B32B 27/308* (2013.01); *B32B 27/325* (2013.01); *B32B 27/36* (2013.01); *B32B 27/365* (2013.01); *C08J 7/042* (2013.01);
(Continued)

(58) Field of Classification Search
CPC ..... C09B 57/10; C09B 69/109; C09B 62/465; B32B 7/00–7/14; B32B 27/00–27/42; G02B 5/208; G02B 5/22–5/223
See application file for complete search history.

(56) References Cited

U.S. PATENT DOCUMENTS

| 10,036,838 B2 | 7/2018 | Bak et al. |
| 2001/0005278 A1* | 6/2001 | Onomichi .............. G02B 5/223 359/885 |

(Continued)

FOREIGN PATENT DOCUMENTS

| JP | H07-100996 | 4/1995 |
| JP | 2002156521 | 5/2002 |

(Continued)

*Primary Examiner* — Prashant J Khatri
(74) *Attorney, Agent, or Firm* — Harness, Dickey & Pierce, P.L.C.

(57) ABSTRACT

Disclosed are an optical structure, and a camera module and an electronic device including the same. The optical structure includes a transparent substrate; a first moisture-proof layer disposed on the transparent substrate and including a first organic material having moisture-proof properties; and a first near-infrared absorbing layer disposed between the transparent substrate and the first moisture-proof layer and including a copper complex, wherein the first organic material having moisture-proof properties has a water vapor transmission rate (WVTR) of less than or equal to about 100 g/m²/day measured at a thickness of 100 μm.

20 Claims, 17 Drawing Sheets

(51) Int. Cl.
| | |
|---|---|
| H04N 5/225 | (2006.01) |
| G02B 5/20 | (2006.01) |
| B32B 27/08 | (2006.01) |
| B32B 27/28 | (2006.01) |
| B32B 27/30 | (2006.01) |
| B32B 27/32 | (2006.01) |
| B32B 27/36 | (2006.01) |
| C09D 169/00 | (2006.01) |
| C09D 7/41 | (2018.01) |
| C09D 4/00 | (2006.01) |
| C08J 7/04 | (2020.01) |
| C09D 7/61 | (2018.01) |
| G02B 1/18 | (2015.01) |
| C09B 45/00 | (2006.01) |
| C09D 7/42 | (2018.01) |
| B32B 27/18 | (2006.01) |

(52) U.S. Cl.
CPC ............... *C09B 45/00* (2013.01); *C09D 4/00* (2013.01); *C09D 7/41* (2018.01); *C09D 7/42* (2018.01); *C09D 7/61* (2018.01); *C09D 169/00* (2013.01); *G02B 1/18* (2015.01); *G02B 5/208* (2013.01); *G02B 5/223* (2013.01); *H04N 5/2252* (2013.01); *B32B 27/18* (2013.01); *B32B 2559/00* (2013.01)

(56) References Cited

U.S. PATENT DOCUMENTS

| | | | |
|---|---|---|---|
| 2018/0017720 A1* | 1/2018 | Arimura | ............... C09B 57/007 |
| 2018/0017722 A1* | 1/2018 | Arimura | ................ B32B 27/40 |
| 2018/0188428 A1 | 7/2018 | Arimura et al. | |

FOREIGN PATENT DOCUMENTS

| | | |
|---|---|---|
| JP | 2014-197170 | 10/2014 |
| JP | 2015-210478 | 11/2015 |
| JP | 6230479 | 10/2017 |
| JP | 2018-084647 | 5/2018 |
| KR | 10-1853263 | 4/2018 |
| WO | WO-2017-056803 | 4/2017 |

* cited by examiner

OPTICAL STRUCTURE, CAMERA MODULE, AND ELECTRONIC DEVICE

CROSS-REFERENCE TO RELATED APPLICATION

This application claims priority to and the benefit of Korean Patent Application No. 10-2019-0032555 filed in the Korean Intellectual Property Office on Mar. 21, 2019, the entire contents of which are incorporated herein by reference.

BACKGROUND

1. Field

An optical structure having near-infrared absorptivity, a camera module, and an electronic device are disclosed.

2. Description of the Related Art

Recently, electronic devices including image sensors that store images as electrical signals, such as cell phones, digital cameras, camcorders, and cameras, have been widely used.

These electronic devices may include a near-infrared absorbing film having near-infrared absorptivity in order to reduce or prevent generation of an optical distortion by light in the other regions than a visible region.

The near-infrared absorbing film is generally mounted in front of an image sensor of a camera module and thus plays a role of effectively absorbing an incident near-infrared light and resolving the optical distortion phenomenon.

Recently, as the need for thinner and highly integrated devices grow, many attempts to make the near-infrared absorbing film into a thin film have been made. For example, when an image sensor in an electronic device recognizes light in the visible wavelength spectrum and in the infrared to near-infrared wavelength, it may cause a flare phenomenon such as a wifi-type flare phenomenon such that an outline is generated around the subject, a petal flare phenomenon such that light is irradiated with the subject as the center, and the like.

Accordingly, in order to minimize the optical distortion phenomenon, light in the near-infrared wavelength region detected by the image sensor but not recognized by human eyes needs to be absorbed or reflected and thus blocked.

SUMMARY

An optical structure having improved optical properties (excellent near-infrared absorbance and low visible absorbance) and hygroscopic resistance is provided.

In addition, a camera module and an electronic device that exhibit improved optical properties and hygroscopic resistance including the optical structure are provided.

According to an embodiment, an optical structure includes a transparent substrate; a first moisture-proof layer disposed on the transparent substrate and including a first organic material having moisture-proof properties; and a first near-infrared absorbing layer disposed between the transparent substrate and the first moisture-proof layer and including a copper complex, wherein the first organic material having moisture-proof properties has a water vapor transmission rate (WVTR) of less than or equal to about 100 g/m²/day measured at a thickness of 100 μm.

The first organic material having moisture-proof properties may have a saturated absorption rate of less than or equal to about 0.25%.

The first organic material having moisture-proof properties may include a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), polymethylmetacrylate (PMMA), a derivative thereof, or a combination thereof.

The first moisture-proof layer may be in a direct contact with the first near-infrared absorbing layer.

The first organic material having moisture-proof properties may be cured by heat or light.

The transparent substrate may include polyethylene terephthalate (PET), polyethylene naphthalate (PEN), triacetyl cellulose (TAC), polyimide (PI), cycloolefin copolymer (COC), polybutylene succinate (PBS), polycarbonate (PC), polyetherimide (PEI), perfluoroalkoxy alkanes (PFA), polystyrene (PS), polymethylmethacrylate (PMMA), a derivative thereof, or a combination thereof.

The copper complex may be represented by Chemical Formula 1.

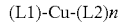   [Chemical Formula 1]

In Chemical Formula 1,
L1 is a ligand represented by Chemical Formula A,
L2 is a ligand selected from a substituted or unsubstituted phosphate group, a substituted or unsubstituted phosphonate group, a substituted or unsubstituted sulfate group, and a substituted or unsubstituted sulfonate group (provided that L2 does not include a hydroxyl group (—OH)), and
n is 1 to 4.

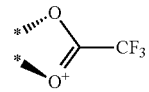   [Chemical Formula A]

In Chemical Formula A,
* is a linking point with Cu.
The L2 may be a ligand represented by Chemical Formula B.

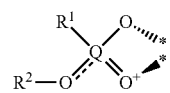   [Chemical Formula B]

In Chemical Formula B,
Q is S or P,
R1 and R2 are each independently one of hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, —ORb1, —C(=O)Rb2, —OC(=O)Rb3 (wherein Rb1, Rb2, and Rb3 are each independently one of hydrogen, a substituted or unsubstituted C1 to C20 alkyl group, a substituted or unsubstituted C2 to C20 alkenyl group, a substituted or unsubstituted C6 to C20 aryl group, and a substituted or unsubstituted C3 to C20 heteroaryl group) and a functional group represented by Chemical Formula X (provided that R1, R2, Rb1, Rb2, and Rb3 do not include a hydroxyl group), and

* is a linking point with Cu.

[Chemical Formula X]

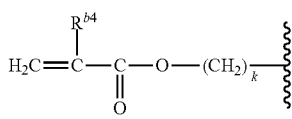

In Chemical Formula X,

Rb4 is selected from hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group (provided that Rb4 does not include a hydroxyl group), and k is an integer ranging from 0 to 8.

A second near-infrared absorbing layer may be further included between the transparent substrate and the first moisture-proof layer, on the other surfaces of the transparent substrate, or any combination thereof.

The second near-infrared absorbing layer may include an organic dye and an organic binder having moisture-proof properties.

The organic dye may include a polymethine compound, a phthalocyanine compound, a merocyanine compound, a naphthalocyanine compound, an immonium compound, diimmonium compound, a triarylmethane compound, a dipyrromethene compound, an anthraquinone compound, naphthoquinone, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof.

The organic binder having moisture-proof properties may include a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), a derivative thereof, or a combination thereof.

The optical structure may further include a second moisture-proof layer including a second organic material having moisture-proof properties. The second near-infrared absorbing layer may be disposed on the other surface of the transparent substrate and the second moisture-proof layer may be disposed to face the transparent substrate while the second near-infrared absorbing layer is disposed there between.

The second organic material having moisture-proof properties may have a water vapor transmission rate (WVTR) of less than or equal to about 100 g/m²/day measured at a thickness of 100 μm and a saturated absorption rate of less than or equal to about 0.25%.

The second organic material may include a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), polymethylmetacrylate (PMMA), a derivative thereof, or a combination thereof.

An infrared reflection layer may be further included on at least one of one surface of the transparent substrate and one surface of the first moisture-proof layer.

The optical structure after being placed at a temperature of 80° C. under relative humidity of 85 RH % for 120 hours may exhibit a change of an average light transmittance of less than or equal to about 8% in a wavelength region of about 430 nm to about 565 nm.

The optical structure after being placed at a temperature of 80° C. under relative humidity of 85 RH % for 120 hours may exhibit a change of an average light transmittance of less than or equal to about 3% in a wavelength region of about 850 nm to about 1200 nm.

According to another embodiment, a camera module includes a lens; an image sensor; and the aforementioned optical structure disposed between the lens and the image sensor.

According to another embodiment, an electronic device including the aforementioned optical structure is provided.

The optical structure according to an embodiment exhibits excellent near-infrared absorbance and low visible absorbance in a high temperature/high humidity environment, and thus even if such an optical structure is applied to various environments, optical distortion phenomenon may be minimized and a clear image may be obtained.

Therefore, a camera module and an electronic device including the optical structure may obtain an image having a minimized optical distortion phenomenon even in various environments such as a high temperature/high humidity environment and the like.

BRIEF DESCRIPTION OF THE DRAWINGS

FIG. 14 is a schematic diagram of an electronic device 1300 according to

SOME EXAMPLE EMBODIMENTS

Figure 15:
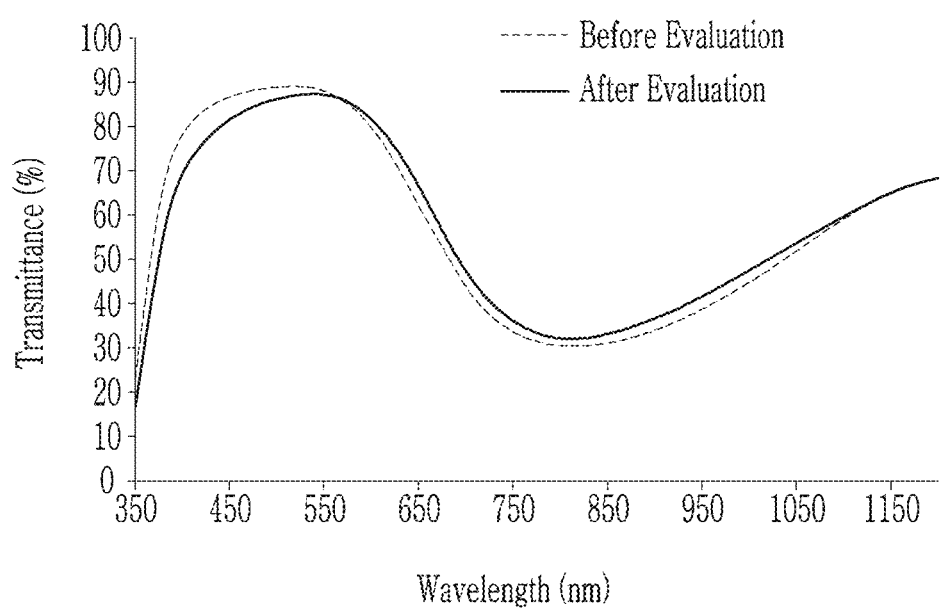
Figure 16:
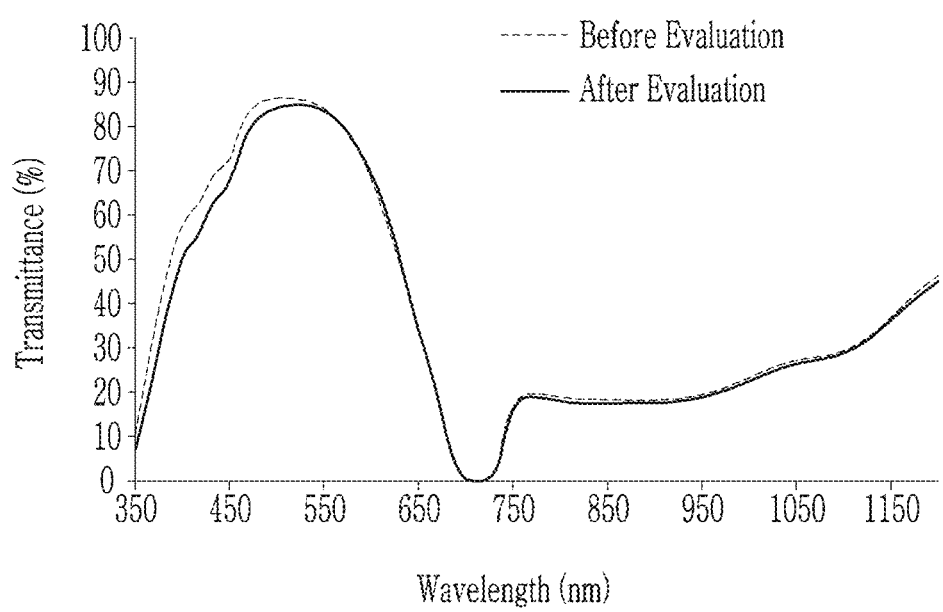
Figure 17:
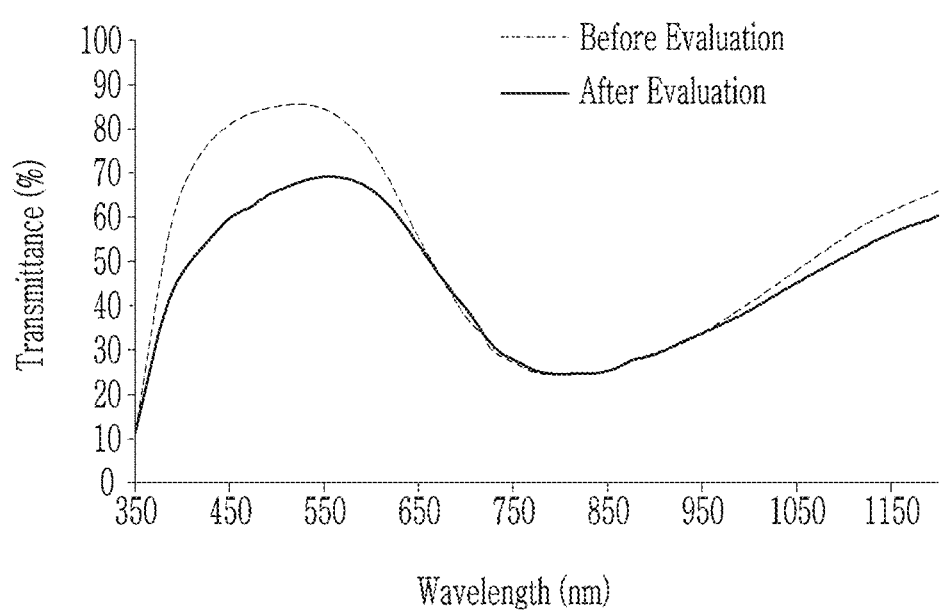

FIGS. 15 to 17 are graphs showing absorbance depending on a wavelength of the optical structure before and after the high temperature/high humidity: FIG. 15 shows the result of Example 3, FIG. 16 shows the result of Example 9, and FIG. 17 shows the result of Comparative Example 2.

DETAILED DESCRIPTION

Hereinafter, example embodiments will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when specific definition is not otherwise provided, "substituted" refers to replacement of at least one hydrogen atom by various substituents except a hydroxyl group (—OH), for example a halogen atom (F, Cl, Br, or I), a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

When the terms "about" or "substantially" are used in this specification in connection with a numerical value, it is intended that the associated numerical value include a tolerance of ±10% around the stated numerical value. When ranges are specified, the range includes all values there between such as increments of 0.1%.

In the present specification, when a definition is not otherwise provided, hydrogen is bonded at the position when a chemical bond is not drawn in chemical formula where supposed to be given.

Hereinafter, an optical structure according to an embodiment is described referring to FIG. 1.

Figure 1:
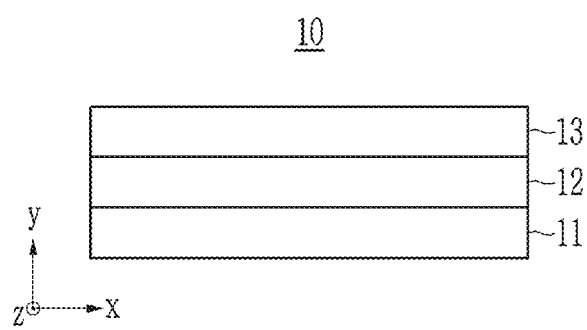
FIG. 1 is a schematic cross-sectional view showing an optical structure according to an embodiment.

FIG. 1 is a schematic cross-sectional view showing an optical structure according to an embodiment.

Referring to FIG. 1, an optical structure 10 according to an embodiment includes a transparent substrate 11, a first near-infrared absorbing layer 12, and a first moisture-proof layer 13. In an embodiment, as an example of the optical structure 10, the first near-infrared absorbing layer 12 is illustrated on transparent substrate 11 for convenience, but the optical structure 10 according to an embodiment is not necessarily limited.

For example, an optical structure according to an embodiment may be formed directly on an image sensor, not on a transparent substrate, or may be a film covered with a releasing paper or the like.

On the other hand, the first near-infrared absorbing layer may be composed of a monolayer or a multilayer of two or more layers. In the case of a multilayer, it may further include a layer-to-layer interface adhesive. The first near-infrared absorbing layer and another layer having near-infrared absorbing and/or reflecting functions may form a multilayer of two or more.

The transparent substrate 11 may be made of an optically transparent substrate and may have, for example an average light transmittance of greater than or equal to about 80% in the visible spectrum. Herein, the visible spectrum may be for example a wavelength region of greater than about 380 nm and less than about 700 nm and the average light transmittance is an average value of light transmittance measured when incident light is radiated in a vertical direction (y-direction) of the transparent substrate 11.

In an embodiment, the transparent substrate 11 may have a yellow index measured using ASTM D1925 of less than or equal to about 10.

The transparent substrate 11 may have a thickness of greater than or equal to about 10 μm, and less than or equal to about 150 μm, for example about 20 μm to about 150 μm, about 30 μm to about 150 μm, about 40 μm to about 150 μm, or about 50 μm to about 150 μm.

In an embodiment, the transparent substrate 11 may also be a substrate made of an oligomer and/or a polymer. The transparent substrate 11 may include a material, for example polyethylene terephthalate (PET), polyethylene naphthalate (PEN), triacetyl cellulose (TAC), polyimide (PI), cycloolefin copolymer (COC), polybutylene succinate (PBS), polycarbonate (PC), polyetherimide (PEI), perfluoroalkoxy alkanes (PFA), polystyrene (PS), polymethylmethacrylate (PMMA), a derivative thereof, or a combination thereof.

However, an embodiment is not necessarily limited thereto, and the material of the transparent substrate 11 may include inorganic materials like glass, crystals, and the like.

The transparent substrate 11 may selectively absorb at least a portion of light in an ultraviolet (UV) region. Ultraviolet (UV) absorptivity of the transparent substrate 11 may be caused by a material itself of the transparent substrate 11, but the transparent substrate 11 having ultraviolet (UV) absorptivity may be formed by adding an ultraviolet (UV) absorber thereto. Herein, the ultraviolet (UV) region may be, for example, a wavelength region of less than or equal to about 380 nm.

The transparent substrate 11 may absorb most of light in a wavelength region of at least about 350 nm to about 380 nm, and thus an average light transmittance of the optical structure 10 in a wavelength region of about 350 nm to about 380 nm may be less than or equal to about 1%.

The transparent substrate 11 may include various additives according to desirable properties of the optical structure 10 as needed.

The first near-infrared absorbing layer 12 may be disposed between the transparent substrate 11 and the first moisture-proof layer 13 that will be described later. The first near-infrared absorbing layer 12 may transmit light in a visible region and may selectively absorb at least a portion of light in a near-infrared region. Herein, the visible region may be for example a wavelength region of greater than about 380 nm and less than about 700 nm and the near-infrared region may be for example a wavelength region of about 700 nm to about 1200 nm.

The first near-infrared absorbing layer 12 includes a copper complex having near-infrared absorptivity and may further include a cross-linking polymerization product that is obtained by a cross-linking polymerization of a thermally polymerizable or photo-polymerizable polymer by heat or light respectively. The thermally polymerizable or photo-polymerizable polymer may include an acryl-based polymer, an epoxy-based polymer, a radical initiator, or a combination thereof.

In an embodiment, when the copper complex has the functional group represented by Chemical Formula X, the copper complex may form a cross-linking polymerization with the thermally polymerizable or photo-polymerizable polymer by heat or light through the functional group represented by Chemical Formula X.

In an embodiment, the first near-infrared absorbing layer 12 may further include a surfactant, an anti-oxidizing agent, a photoinitiator, and the like in addition to the copper complex and the cross-linking polymerization product.

The first near-infrared absorbing layer 12 may be formed by coating a near-infrared absorption composition including the aforementioned copper complex, and optionally polymerizable cross-linking monomers, the surfactant, the anti-oxidizing agent, the photoinitiator, a solvent (e.g., water, organic solvent, or combination thereof), and the like on the transparent substrate 11 and then curing the same.

As described above, it may be obtained without a separate drying process. That is, the first near-infrared absorbing layer 12 may be obtained by coating the optical structure composition on the transparent substrate 11, for example directly on the surface of the transparent substrate 11, or directly on the interface adhesive layer formed on the transparent substrate 11 and then drying and curing the same.

The coating may be for example a spin coating, a slit coating, a bar coating, a blade coating, a slot die coating, and/or an inkjet coating and the curing may be optionally performed by heat and/or light.

In an embodiment, the copper complex may be coordinated with a ligand that does not include a hydroxyl group.

When a copper complex contacts water molecules inside or outside the optical structure, the contacted water molecules are likely to coordinate with the copper complex. If the copper complex includes a hydroxyl group, the water molecules may be drawn to the copper complex by a chemical bond (e.g., hydrogen bond, etc.) with the hydroxyl group, and the drawn water molecules may be coordinated to the copper complex. Because the coordinated water molecules may affect the optical properties of the copper complex, the copper complex may not exhibit the desired optical properties (improved near-infrared absorptivity and/or low visible absorptivity).

On the other hand, the copper complex according to an embodiment may be prevented and/or minimized from being unintentionally coordinated with the water molecules by keeping the ligands mostly non-polar and/or excluding the use of hydroxyl groups as part of the ligands.

Specifically, the copper complex may be represented by Chemical Formula 1.

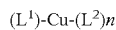  [Chemical Formula 1]

In Chemical Formula 1, $L^1$ is a ligand represented by Chemical Formula A, $L^2$ is a ligand selected from a substituted or unsubstituted phosphate group, a substituted or unsubstituted phosphonate group, a substituted or unsubstituted sulfate group, and a substituted or unsubstituted sulfonate group (provided that $L^2$ does not include a hydroxyl group (—OH)), and n is 1 to 4.

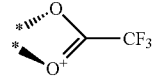  [Chemical Formula A]

In Chemical Formula A,

* is a linking point with Cu.

$L^2$ may include a ligand represented by Chemical Formula B.

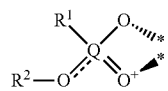  [Chemical Formula B]

In Chemical Formula B,

Q is S or P, $R^1$ and $R^2$ are each independently one of hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, —$OR^{b1}$, —$C(=O)R^{b2}$, —$OC(=O)R^{b3}$ (wherein $R^{b1}$, $R^{b2}$, and $R^{b3}$ are each independently one of hydrogen, a substituted or unsubstituted C1 to C20 alkyl group, a substituted or unsubstituted C2 to C20 alkenyl group, a substituted or unsubstituted C6 to C20 aryl group, and a substituted or unsubstituted C3 to C20 heteroaryl group) and a functional group represented by Chemical Formula X (provided that $R^1$, $R^2$, $R^{b1}$, $R^{b2}$, and $R^{b3}$ do not include a hydroxyl group), and

* is a linking point with Cu.

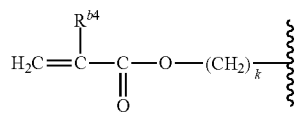  [Chemical Formula X]

In Chemical Formula X, $R^{b4}$ is selected from hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group (provided that $R^{b4}$ does not include a hydroxyl group), and k is an integer ranging from 0 to 8.

In an embodiment, $L^2$ may include a ligand represented by Chemical Formula B-1.

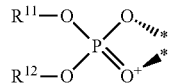  [Chemical Formula B-1]

In Chemical Formula B-1, $R^{11}$ and $R^{12}$ are each independently one of hydrogen, a substituted or unsubstituted C1 to C20 alkyl group, a substituted or unsubstituted C1 to C20 heteroalkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group and a functional group represented by Chemical Formula X (provided that $R^{11}$ and $R^{12}$ do not include a hydroxyl group), and

* is a linking point with Cu.

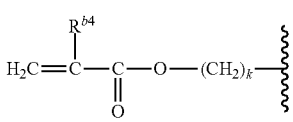

[Chemical Formula X]

In Chemical Formula X, $R^{b4}$ is selected from hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group (provided that $R^{b4}$ does not include a hydroxyl group), and k is an integer ranging from 0 to 8.

In an embodiment, at least one of $R^{11}$ and $R^{12}$ may be selected from a substituted or unsubstituted C1 to 10 linear or branched alkyl group, a substituted or unsubstituted C1 to C10 aryl group, and the functional group represented by Chemical Formula X.

In an embodiment, $L^2$ may include a ligand represented by Chemical Formula B-2.

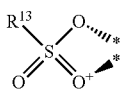

[Chemical Formula B-2]

In Chemical Formula B-2, $R^{13}$ is selected from hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, $-OR^{b1}$, $-C(=O)R^{b2}$, $-OC(=O)R^{b3}$ (wherein $R^{b1}$, $R^{b2}$, and $R^{b3}$ are each independently one of hydrogen, a substituted or unsubstituted C1 to C20 alkyl group, a substituted or unsubstituted C2 to C20 alkenyl group, a substituted or unsubstituted C6 to C20 aryl group, and a substituted or unsubstituted C3 to C20 heteroaryl group), and a functional group represented by Chemical Formula X (provided that each of $R^{11}$, $R^{12}$, $R^{b1}$, $R^{b2}$, and $R^{b3}$ does not include a hydroxyl group), and

* is a linking point with Cu.

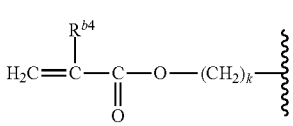

[Chemical Formula X]

In Chemical Formula X, $R^{b4}$ is selected from hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group (provided that $R^{b4}$ does not include a hydroxyl group), and k is an integer ranging from 0 to 8.

In an embodiment, R13 may be selected from a substituted or unsubstituted C1 to 10 linear or branched alkyl group and a substituted or unsubstituted C6 to C10 aryl group.

The copper complex according to an embodiment does not include a hydroxyl group as described above, so that it is possible to prevent or minimize the coordination of water molecules thereto, and may also include two types of different ligands, L1 that is a tetrafluoro acetate ligand and L2 that is an acid ligand including P or S.

In an embodiment, L1 may function as a ligand capable of securing solubility for an organic solvent, and L2 may function as a ligand capable of securing an absorptivity for a near-infrared wavelength region.

Therefore, the copper complex with two types of different ligands such as the copper complex according to an embodiment may maintain coating properties by maintaining good solubility in an organic solvent even when a molecular weight of the ligand is reduced and it is easy to adjust a maximum absorption wavelength of the first near-infrared absorbing layer 12 to within predetermined ranges (e.g., greater than or equal to about 790 nm, greater than or equal to about 900 nm, less than or equal to about 860 nm, from about 790 nm to about 900 nm, for example, about 790 nm to about 860 nm).

In an embodiment, the acryl-based polymer and/or the epoxy-based polymer included in the first near-infrared absorbing layer 12 may be a polymer obtained by polymerization of the polymerizable cross-linking monomers that may be included in the aforementioned optical structure. The polymerization reaction of the polymer may depend on the characteristics of the polymerizable cross-linking monomers, but may be carried out by for example heat and/or light.

Meanwhile, the first near-infrared absorbing layer 12 according to an embodiment may further include an organic dye having near-infrared absorptivity in addition to the aforementioned copper complex.

The organic dye has a narrower line width of a near-infrared absorption wavelength compared with the copper complex, and may be used with the aforementioned copper complex when it is necessary to complement absorption capability for a specific narrow wavelength region band in the near-infrared ray. In other words, the first near-infrared absorbing layer 12 according to an embodiment may include one or more organic dyes having an absorption capability for a specific near-infrared wavelength region that needs to be complemented, together with the aforementioned copper complex, which are complementary.

However, an embodiment is not necessarily limited thereto, and a second near-infrared absorbing layer including the organic dye may be formed as a separate layer that is distinct from the first near-infrared absorbing layer 12. This will be described later.

In an embodiment, the first near-infrared absorbing layer 12 may have for example a thickness of about 10 μm to 200 μm. When it has a thickness within this range, the optical structure 10 may exhibit good optical properties (good near-infrared absorptivity and low visible absorptivity).

However, the embodiment is not limited thereto and the thickness of the first near-infrared absorbing layer 12 may be variously set in consideration of a relationship with the other components constituting the optical structure 10, for example, the transparent substrate 11, the second near-infrared absorbing layer including an organic dye which will be described later, and an infrared reflection layer.

In an embodiment, the first moisture-proof layer 13 may be disposed to face the substrate 11 while the first near-infrared absorbing layer 12 is disposed there between. That is, the first near-infrared absorbing layer 12 is disposed between the substrate film 11 and the first moisture-proof layer 13, and the first moisture-proof layer 13 is disposed on one surface of the first near-infrared absorbing layer 12, to prevent penetration of moisture/humidity from the outside into the first near-infrared absorbing layer 12.

For example, the first moisture-proof layer 13 may be in direct contact with the first near-infrared absorbing layer 12. That is, the first moisture-proof layer 13 is in contact with a surface of the first near-infrared absorbing layer 12 to prevent the first near-infrared absorbing layer 12 from exposing to the outside and a separate layer is not disposed between the first moisture-proof layer 13 and the first near-infrared absorbing layer 12, it is possible to prevent moisture/humidity penetrated from the outside from moving into the first near-infrared absorbing layer 12 during the formation of the separate layer.

However, an embodiment is not necessarily limited thereto. Depending on the material included in the first near-infrared absorbing layer 12 and the material included in the first moisture-proof layer 13 (e.g., the material of the first organic material having moisture-proof properties), an interface adhesive layer including a primer, a pressure-sensitive adhesive, and the like and a second near-infrared absorbing layer including an organic dye may be further disposed between the first near-infrared absorbing layer 12 and the first moisture-proof layer 13.

In an embodiment, the first moisture-proof layer 13 may include the first organic material having moisture-proof properties. As the first moisture-proof layer 13 includes the first organic material having moisture-proof properties, it may block moisture/humidity from passing through the first moisture-proof layer 13 and moving toward the first near-infrared absorbing layer 12.

Specifically, the first organic material having moisture-proof properties may for example have a water vapor transmission rate (WVTR), measured at a thickness of 100 μm, of less than or equal to about 100 g/m2/day, or even less than or equal to about 1 g/m2/day or less than or equal to about 0.5 g/m2/day.

The water vapor transmission rate is obtained by providing about 100 μm thin film of the first organic material, allowing the same to stand under the environment at about 37° C. and about 90 RH % for about 24 hours using the known moisture transmission measurer, and measuring the moisture transmitted amount using a humidity sensor.

In addition, the first organic material having moisture-proof properties may be a first organic material showing hydrophobicity. In other words, as the first organic material shows hydrophobicity, it may show low moisture-absorbing properties. For example, the first organic material may have a saturated absorption rate of less than or equal to about 0.25%, or even less than or equal to about 0.01%.

In an embodiment, the first organic material is formed in a thin film, allowed to stand in water at about 23° C. for the predetermined time, and taken out, and then moisture of the thin film is measured according to a vacuum drying method to determine a weight ratio of moisture, which means the saturated absorption rate.

Specifically, according to ASTM D570, the first organic material is formed in a thin film having a length*width*thickness of about 50 mm*about 50 mm*about 3 mm, and then an initial weight is measured. Then the obtained thin film is allowed to stand in a thermostat including distilled water set at 23° C. for 24 hours, and then the thin film is taken out from there and measured for the weight according to a vacuum drying method at 30° C., and a ratio of the increased weight relating to the initial weight is calculated to provide a saturated absorption rate.

When the first organic material having moisture-proof properties shows the saturated absorption rate, the first moisture-proof layer 13 may show both moisture-proof properties caused by the first organic material and hydrophobicity, so it may prevent and/or minimize the transmission of moisture/humidity through the first moisture-proof layer 13, and also may prevent and/or minimize the penetrate into the first moisture-proof layer 13, itself. Thereby, it may provide the first moisture-proof layer 13 with further improved moisture-proof properties.

In an embodiment, examples of the first organic material having moisture-proof properties may be a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), polymethylmetacrylate (PMMA), a derivative thereof, or a combination thereof. The first organic material may be used as one or more types of materials, for example as a mixture of two or more.

In an embodiment, the first organic material having moisture-proof properties may be an oligomer and/or a polymer which are cured by heat and/or light. For example, the first organic material having moisture-proof properties may be obtained by curing thermosetting and/or photocurable polymerizable monomers by heat and/or light. In this case, the first moisture-proof layer 13 may be easily formed using known heat and/or light polymerization methods.

In an embodiment, the first moisture-proof layer 13 may include the first organic material having moisture-proof properties in an amount of greater than or equal to about 50 wt %, or even about 100 wt % based on a total weight of the first moisture-proof layer 13.

Meanwhile, in the optical structure 10 according to an embodiment, the first organic material having moisture-proof properties may be also included in the substrate film 11. When the substrate film 11 includes, for example, cycloolefin copolymer (COC), polycarbonate (PC), and the like among the materials, the substrate film 11 may also show moisture-proof properties caused by the materials.

In this case, the optical structure 10 may prevent and/or minimize the penetration and the transmission of exterior moisture/humidity through the substrate film 11 and the first moisture-proof layer 13 disposed on both surfaces of the first near-infrared absorbing layer 12.

As described above, the optical structure 10 according to an embodiment may prevent and/or minimize the transport of moisture/humidity to the copper complex in the first near-infrared absorbing layer 12 through the first moisture-proof layer 13 including the first organic material having moisture-proof properties, so it may show excellent optical properties (near-infrared absorbance and low visible absorbance) even under the high temperature/high humidity environment. Accordingly, the optical structure 10 may minimize an optical distortion phenomenon and provide clear images even if being employed in the various environments.

Accordingly, a camera module and an electronic device including the optical structure may provide images that optical distortion phenomenon is minimized even under the various environments of relatively high temperature/high humidity environment, and the like.

As the optical structure 10 includes a structure that a transparent substrate 11, a first near-infrared absorbing layer 12, and a first moisture-proof layer 13 are sequentially stacked as mentioned in above, it may effectively transmit light in a visible region and effectively block light in a near-infrared region.

In addition, the optical structure 10 may prevent and/or minimize the transport of moisture/humidity to the copper complex in the first near-infrared absorbing layer 12 through the first moisture-proof layer 13 including the first organic material having moisture-proof properties, so that it may show excellent optical properties (near-infrared absorbance and low visible absorbance) even under the high temperature/high humidity environment.

In addition, by applying the transparent substrate 11 with functions on absorbing light in ultraviolet (UV) region, it may effectively block light in the ultraviolet (UV) region, and by adjusting transparent substrate 11 to include the first organic material having moisture-proof properties, it may further enhance moisture-proof properties of the optical structure 10.

Thereby, the optical structure 10 may show excellent optical properties (excellent near-infrared absorptivity and low visible absorptivity) even under the various environments of high temperature/high humidity environments, and the like.

That is, the optical structure 10 may effectively transmit light in a visible region and selectively block light in a near-infrared region by associating the transparent substrate 11, the first near-infrared absorbing layer 12, and the first moisture-proof layer 13.

For example, the optical structure after being placed at a temperature of 80° C. under relative humidity of 85 RH % for 120 hours may exhibit a change of an average light transmittance of less than or equal to about 8%, or even less than or equal to about 3.5% in a wavelength region of about 430 nm to about 565 nm.

On the other hand, the optical structure after being placed at a temperature of 80° C. under relative humidity of 85 RH % for 120 hours may exhibit a change of an average light transmittance of less than or equal to about 3%, or even less than or equal to about 0.5% in a wavelength region of about 850 nm to about 1200 nm.

In an embodiment, "a change of an average light transmittance" refers to an absolute value of a difference between average light transmittances before and after application of environmental evaluations of the high temperature (80° C.)/high humidity (85 RH %) in an average light transmittance of the optical structure 10.

The optical structure 10 may have for example a thickness of about 10 μm to 200 μm. Within the ranges of the thickness, a thin-film, down-sized infrared absorption optical structure while having improved optical properties and hygroscopic resistance may be realized.

In this way, the optical structure 10 may selectively absorb light in a near-infrared wavelength region corresponding to a boundary between a visible region and an infrared region out of all the wavelength region and thus reduce or prevent crossing and mingling of a signal by light in a visible region with a signal by light in a nonvisible region and may reduce or prevent an optical distortion such as a crosstalk.

In addition, the optical structure 10 may effectively absorb light in a near-infrared region regardless of an incident direction and accordingly, effectively absorb and block incident light in a near-infrared region from a side direction and thus reduce or prevent the incident light in a near-infrared region from a side direction from distorting the signal by light in a visible region.

In addition, the optical structure 10 shows excellent optical properties (excellent near-infrared absorptivity and low visible absorptivity) even under high temperature/high humidify environments, so that it may effectively sense light in a visible region by a sensor sensing light, for example, an image sensor, so as to reduce or prevent the optical distortion generated by light except the visible region.

Hereinafter, referring to FIGS. 2 to 5, optical structures according to other embodiments are described.

Figure 2:
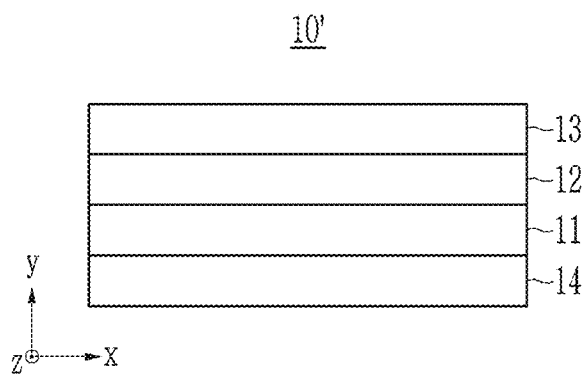
FIG. 2 is a schematic cross-sectional view showing an optical structure according to another embodiment.
Figure 3:
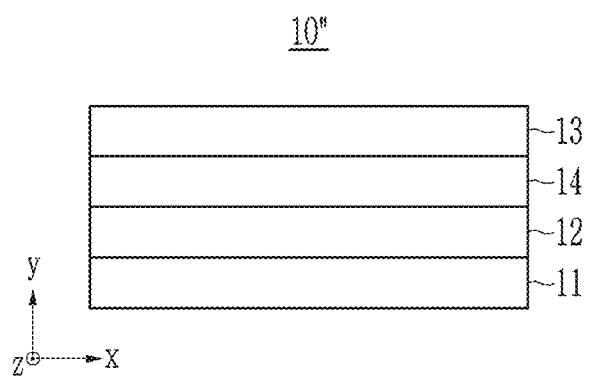
FIG. 3 is a schematic cross-sectional view of an exemplary variation of the optical structure shown in FIG. 2.
Figure 4:
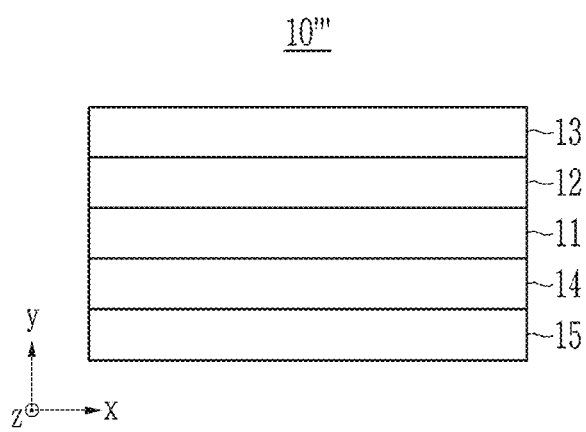
FIG. 4 is a schematic cross-sectional view of another exemplary variation of the optical structure shown in FIG. 2.

FIG. 2 is a schematic cross-sectional view showing an optical structure according to another embodiment, FIG. 3 is a schematic cross-sectional view of an exemplary variation of the optical structure shown in FIG. 2, and FIG. 4 is a schematic cross-sectional view of another exemplary variation of the optical structure shown in FIG. 2.

Referring to FIGS. 2 to 5, the optical structures 10' and 10'' according to another embodiment further include a second near-infrared absorbing layer 14 in addition to the transparent substrate 11, the first near-infrared absorbing layer 12 and the first moisture-proof layer 13.

The transparent substrate 11, the first near-infrared absorbing layer 12, and the first moisture-proof layer 13 are the same as described above.

The second near-infrared absorbing layer 14 is a layer distinguished from the first near-infrared absorbing layer 12 as shown in FIGS. 2 to 3, and may include an organic dye and an organic binder having moisture-proof properties. Thereby, the optical structure 10' and 10'' may absorb near-infrared ray in a wide near-infrared wavelength region using the first near-infrared absorbing layer 12, and also may compensate the near-infrared absorptivity using the second near-infrared absorbing layer 14 including an organic dye having an absorptivity for the near-infrared ray-specified wavelength region band.

Specifically, for example, when an organic dye used for the second near-infrared absorbing layer 14 shows slightly deteriorated near-infrared absorptivity in wavelength region of about 850 nm, it may be used together with the first near-infrared absorbing layer 12 having the maximum absorption wavelength within, for example, about 700 nm to about 950 nm, as mentioned above, so that the optical structures 10' and 10'' may show excellent near-infrared absorptivity across the near-infrared wavelength region.

The organic dye included in the second near-infrared absorbing layer 14 may be for example a polymethine compound, a phthalocyanine compound, a merocyanine compound, a naphthalocyanine compound, an immonium compound, diimmonium compound, a triarylmethane compound, a dipyrromethene compound, an anthraquinone compound, naphthoquinone, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof.

The organic binder having moisture-proof properties may include a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), a derivative thereof, or a combination thereof. The organic binder may be the same as or different from the first organic material having moisture-proof properties included in the aforementioned first moisture-proof layer 13.

The organic binder may be an oligomer and/or a polymer cured by heat and/or light. For example, the organic binder having moisture-proof properties may be obtained by curing a thermosetting and/or photocurable polymerizable monomer using heat and/or light. In this case, the second near-infrared absorbing layer 14 may be easily obtained using the disclosed heat and/or light.

When the second near-infrared absorbing layer 14 includes both the organic dye and the organic binder having moisture-proof properties, it may compensate the performance of blocking the near-infrared region through the second near-infrared absorbing layer 14 and also may provide the second near-infrared absorbing layer 14 having moisture-proof properties. Accordingly, it may prevent and/or minimize moisture/humidity from being transmitted through the second near-infrared absorbing layer 14 and from being transported to the first near-infrared absorbing layer 12.

The second near-infrared absorbing layer 14 may be disposed on at least one of between the transparent substrate 11 and the first moisture-proof layer 13 or the other surface of the transparent substrate 11. For example, the second near-infrared absorbing layer 14 may be disposed facing to the first near-infrared absorbing layer 12 while the transparent substrate 11 is disposed there between as shown in FIG. 2, or may be disposed between the transparent substrate 11 and the first moisture-proof layer 13 as shown in FIG. 3.

The second near-infrared absorbing layer 14 may be composed of a monolayer or a multilayer of two or more layers and in the case of a multilayer, an interface adhesive layer may be further included.

Meanwhile, the interface adhesive layer may be also disposed between other constituent elements (e.g., transparent substrate 11, first near-infrared absorbing layer 12, first moisture-proof layer 13, etc.) adjacent to the second near-infrared absorbing layer 14.

Meanwhile, referring to FIG. 4, the optical structure 10''' may further include a second moisture-proof layer 15 capable of covering the surface of the second near-infrared absorbing layer 14 when the second near-infrared absorbing layer 14 is formed on the other surface of the transparent substrate 11.

The second moisture-proof layer 15 may be disposed facing to the transparent substrate 11 while the second near-infrared absorbing layer 14 is disposed there between as shown in FIG. 4. The second moisture-proof layer 15 may prevent and/or minimize the transport of moisture/humidity to the second near-infrared absorbing layer 14 by contacting the surface of the second near-infrared absorbing layer 14.

The second moisture-proof layer 15 may include a second organic material having moisture-proof properties. The second organic material may for example have a water vapor transmission rate (WVTR) of less than or equal to about 100 g/m2/day, or even less than or equal to about 1 g/m2/day or less than or equal to about 0.5 g/m2/day, like the aforementioned first organic material.

In addition, the second organic material having moisture-proof properties may be a second organic material having hydrophobicity, and thus the second organic material may have a saturated absorption rate of less than or equal to about 0.25%, or even less than or equal to about 0.01%.

Examples of the second organic material may be a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), polymethylmetacrylate (PMMA), a derivative thereof, or a combination thereof. The second organic material may be used as one or more types of materials, for example as a mixture of two or more.

The second organic material may be the same as or may be different from the first organic material.

As in above, as the moisture/humidity contact of the second near-infrared absorbing layer 14 is blocked by the second moisture-proof layer 15 including a second organic material, hygroscopic resistance and optical properties of the optical structure 10''' may be further improved.

As the optical structures 10', 10'', and 10''' commonly include the transparent substrate 11 and the first near-infrared absorbing layer 12 as in the aforementioned embodiment, and as the second near-infrared absorbing layer 14 is further included, it may further improve the performance on blocking the near-infrared region. In addition, if required, by further including the second moisture-proof layer 15, hygroscopic resistance and optical properties of the optical structure may be further enhanced.

Accordingly, when using optical structures 10', 10'', and 10''', the performance on blocking the near-infrared region may be applied through the wider wavelength region, and also it may show excellent optical properties even under the severe environments such as high temperature/high humidity environment, and the like.

Figure 5:
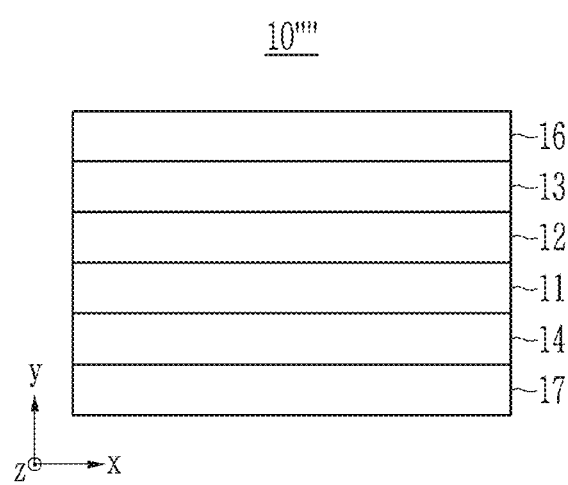
FIG. 5 is a schematic cross-sectional view showing an optical structure according to another embodiment.

FIG. 5 is a schematic cross-sectional view showing an optical structure according to another embodiment.

Referring to FIG. 5, an optical structure 10'''' according to another embodiment includes a transparent substrate 11, a first near-infrared absorbing layer 12, a first moisture-proof layer 13, a second near-infrared absorbing layer 14, and infrared reflection layers 16 and 17.

The transparent substrate 11, the first near-infrared absorbing layer 12, the first moisture-proof layer 13, and the second near-infrared absorbing layer 14 are the same as described above. Although FIG. 5 shows a structure that the second near-infrared absorbing layer 14 is disposed on the other surface of the transparent substrate 11, but the second near-infrared absorbing layer may be disposed between the first near-infrared absorbing layer and the first moisture-proof layer, as shown in FIG. 3.

The infrared reflection layers 16 and 17 may be disposed on at least one of one surface of the transparent substrate 11 and one surface of the first moisture-proof layer 13. FIG. 5 shows a pair of infrared reflection layers 16 and 17 which are respectively disposed on one surface of the transparent substrate 11 and on one surface of the first moisture-proof layer 13, but one of them may be omitted.

The infrared reflection layers 16 and 17 effectively reflect light in an infrared wavelength region and thus may effectively reduce or prevent optical distortion by the light in an infrared wavelength region.

The infrared reflection layers 16 and 17 may reflect light in a portion of a near-infrared region, a mid-infrared region, and a far-infrared region, for example a wavelength region of about 700 nm to about 3 μm.

The infrared reflection layers 16 and 17 are not particularly limited as long as they reflect light in an infrared wavelength region and may be, for example a high refractive-index reflective layer, a reflective layer including a high refractive-index nanoparticle, or a multilayer including a plurality of layers having different refractive indexes, but is not limited thereto.

For example, the infrared reflection layers 16 and 17 may include a first layer and a second layer consisting materials having different refractive indexes, and may include a multilayer where the first layer and the second layer are alternately and repeatedly stacked.

The first layer and the second layer may be, for example a dielectric layer including an oxide layer, a nitride layer, an oxynitride layer, a sulfide layer, or a combination thereof, and for example the first layer may have a refractive index of less than about 1.7 and the second layer may have a refractive index of greater than or equal to about 1.7. Within the ranges the first layer may have a refractive index of greater than or equal to about 1.1 and less than about 1.7 and the second layer may have a refractive index about 1.7 to about 2.7. For example the first layer may have a refractive index of about 1.2 to about 1.6 and the second layer may have a refractive index of about 1.8 to about 2.5.

The first layer and the second layer may include any material having the refractive indexes within the ranges, and for example the first layer may include a silicon oxide, an aluminum oxide, an organic material like polyethylene terephthalate, or a combination thereof and the second layer may include titanium oxide, zinc oxide, indium oxide, zirconium oxide, an organic material, or a combination thereof. The first layer and the second layer may be, for example five-layered to 80-layered, for example 5-layered to 50-layered.

Thicknesses of the first layer and the second layer may be determined according to a refractive index and a reflection wavelength of each layer, for example each of the first layer may have a thickness of about 10 nm to about 700 nm and each of the second layer may have a thickness of about 30 nm to about 600 nm. Thicknesses of the first layer and the second layer may be the same or different.

The optical structure 10'''' may have, for example a thickness of about 10 μm to about 200 μm even if it includes the aforementioned infrared reflection layers 16 and 17. Within the ranges of the thickness, a thin-film, down-sized infrared absorption optical structure may be realized.

The optical structure 10'''' according to the present embodiment includes a transparent substrate 11, a first near-infrared absorbing layer 12, a first moisture-proof layer 13, and a second near-infrared absorbing layer 14 like the aforementioned embodiment and thereby transmits light in a visible region effectively and blocks light in a near-infrared region effectively in a high temperature/high humidity environment. In addition, the optical structure 10'''' according to the present embodiment further includes the infrared reflection layer 16 and 17, thereby reflecting light in an intermediate infrared region and the far infrared region to effectively block it and to effectively prevent transmission of light in all the infrared regions. Accordingly, the optical structure 10'''' may be applied to an electronic device and thus may reduce or prevent distortion of an optical signal in a visible region by light in the infrared region.

The aforementioned optical structures 10, 10', 10'', 10''', and 10'''' may be applied to all uses for filtering light in an infrared wavelength region, and may be, for example applied to a camera module and an electronic device including the same. The electronic device may be a digital camera, a camcorder, a monitoring camera such as CCTV, an in-car camera, a medical camera, a cell phone having a built-in or external camera, a computer having a built-in or external camera, a laptop computer having a built-in or external camera, and the like but is not limited thereto.

Figure 6:
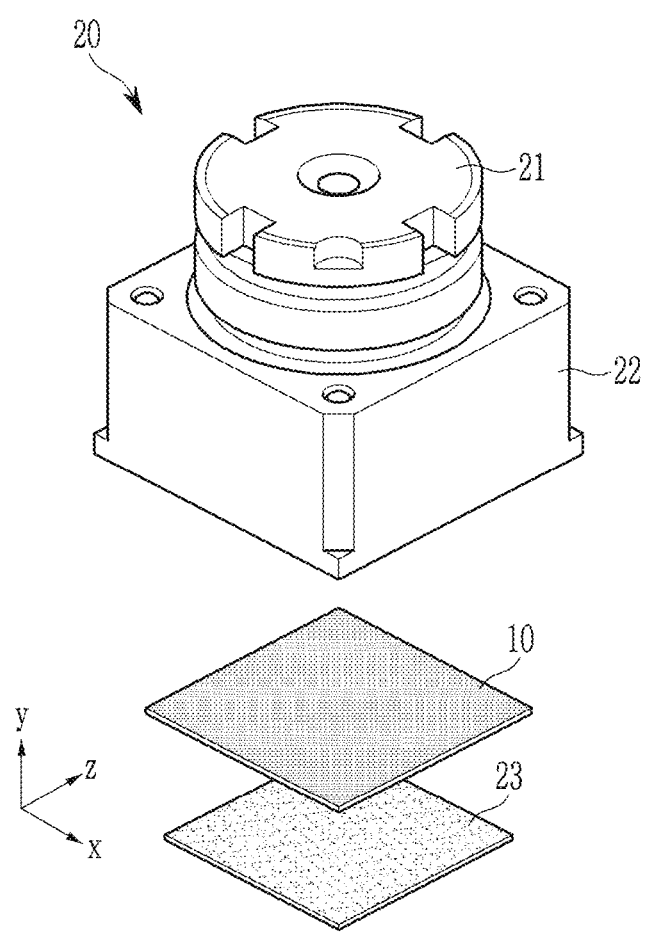
FIG. 6 is a schematic view showing a camera module according to an embodiment.

FIG. 6 is a schematic view showing a camera module according to an embodiment.

Referring to FIG. 6, a camera module 20 includes a lens barrel 21, a housing 22, an optical structure 10, and an image sensor 23.

The lens barrel 21 includes at least one lens imaging a subject, and the lens may be disposed along an optical axis direction. Herein, the optical axis direction may be a vertical direction of the lens barrel 21.

The lens barrel 21 is internally housed in the housing 22 and united with the housing 22. The lens barrel 21 may be moved in optical axis direction inside the housing 22 for autofocusing.

The housing 22 supports and houses the lens barrel 21 and may be open in the optical axis direction. Accordingly, incident light from one surface of the housing 22 may reach the image sensor 23 through the lens barrel 21 and the optical structure 10.

The housing 22 may be equipped with an actuator for moving the lens barrel 21 in the optical axis direction. The actuator may include a voice coil motor (VCM) including a magnet and a coil. However, various methods such as a mechanical driving system or a piezoelectric driving system using a piezoelectric device other than the actuator may be adopted.

The optical structure 10 is the same as described above and may be substituted with the optical structures 10, 10', 10'', 10''', and 10'''' shown in FIGS. 2 to 5.

The image sensor 23 may concentrate an image of a subject and thus store it as data, and the stored data may be displayed as an image through a display media.

The image sensor 23 may be mounted in a substrate (not shown) and electrically connected to the substrate. The substrate may be, for example, a printed circuit board (PCB) or electrically connected to a printed circuit board, and the printed circuit may be, for example, a flexible printed circuit (FPCB).

The image sensor 23 concentrates light passing the lens barrel 21 and the optical structure 10 and generates a video signal and may be a complementary metal-oxide semiconductor (CMOS) image sensor and/or a charge coupled device (CCD) image sensor.

Figure 7:
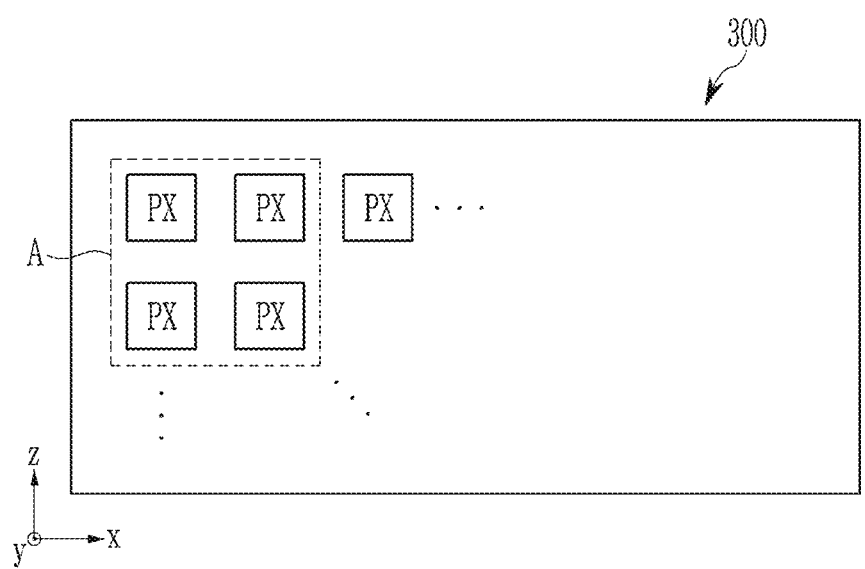
FIG. 7 is a schematic view showing an example of a pixel array of a sensor according to some example embodiments.

FIG. 7 is a schematic view showing an example of a pixel array of a sensor according to some example embodiments Referring to FIG. 7, a sensor 23 according to some example embodiments includes a plurality of pixels (PX) and the plurality of pixels (PX) may have a matrix array repeatedly arranged along rows and columns. The plurality of pixels (PX) may form ("at least partially comprise") a unit pixel group (A) of for example a 2×2 array of pixels, for example as shown in FIG. 7. However, an arrangement of the pixels are not limited thereto but variously modified, and the unit pixel group (A) may be variously modified into different arrays of pixels, including a 3×3 array, a 4×4 array, or the like, besides the 2×2 array.

At least a part of the pixels may include a plurality of sensors having different functions inside one pixel, and the plurality of sensors may be stacked therein. In some example embodiments, each pixel (PX) may include two or more sensors that are configured to sense (e.g., absorb) light in different wavelength regions ("wavelength spectra of light") in relation to each other, and the sensors configured to sense the light in different wavelength regions each other may be stacked in a direction that is perpendicular (e.g., perpendicular within manufacturing tolerances and/or material tolerances) to a top surface 110S of a substrate of the sensor 23, as shown in at least FIG. 6 (e.g., a Y direction). Herein, the light of the different wavelength regions may be respectively selected from a visible wavelength region; an infrared wavelength region including a near infra-red wavelength region; and an ultraviolet (UV) wavelength region.

Figure 8:
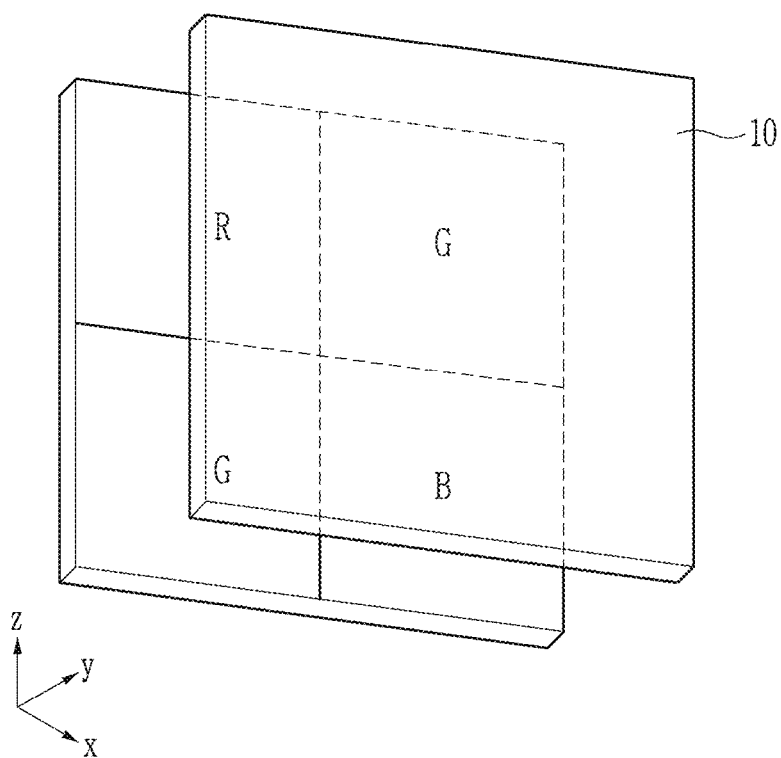
FIG. 8 is a top plan view showing an organic image sensor as an example of an image sensor.

FIG. 8 is a top plan view showing an organic image sensor as one example of an image sensor.

Referring to FIG. 8, the organic image sensor may be formed by arranging a red organic photoelectric device, a green organic photoelectric device, and a blue organic photoelectric device as Bayer shape in a monolayer on an optical structure.

However, an embodiment is necessarily limited thereto, a detailed structures of organic image sensors may be variously set with a kind of materials and structures of the optical structure, and the like.

Figure 9:
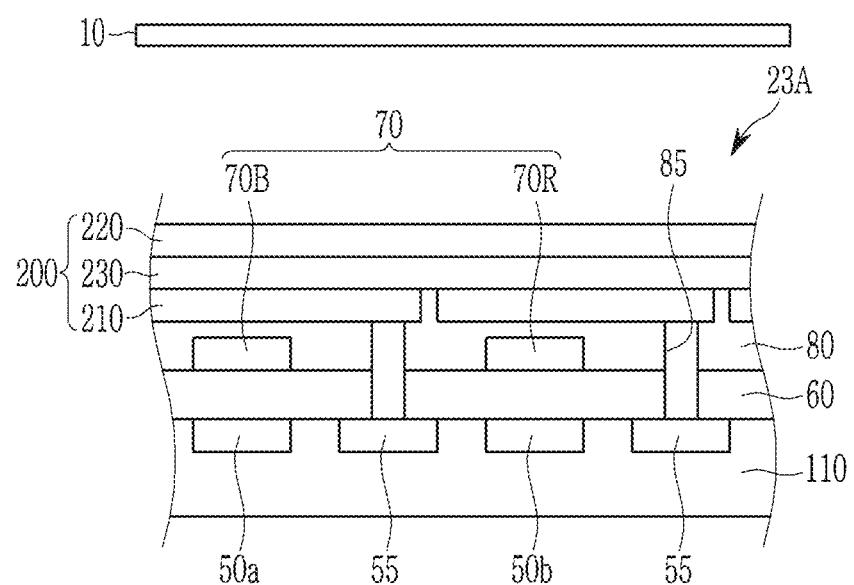
FIG. 9 is a cross-sectional view showing another example of the organic image sensor.

FIG. 9 is a cross-sectional view showing another example of the organic image sensor, Referring to FIG. 9, an organic image sensor 23A according to an embodiment includes a semiconductor substrate 110 integrated with photo-sensing devices 50a and 50b, a transmission transistor (not shown), and a charge storage 55, a lower insulation layer 60, a color filter layer 70, a upper insulation layer 80, and an organic photoelectric device 200.

The semiconductor substrate 110 may be a silicon or silicon based substrate, and is integrated with the photo-sensing devices 50a and 50b, the transmission transistor (not shown), and the charge storage 55. The semiconductor substrate 110 may also be other III-V or II-VI materials, like gallium nitride, or germanium. The photo-sensing devices 50a and 50b may be photodiodes.

The photo-sensing devices 50a and 50b sense light, the information sensed by the photo-sensing devices may be transferred by the transmission transistor, the charge storage 55 is electrically connected to the organic photoelectric device 100, and the information of the charge storage 55 may be transferred by the transmission transistor.

The photo-sensing devices 50a and 50b sense light, the information sensed by the photo-sensing devices may be transferred by the transmission transistor, the charge storage 55 is electrically connected to the organic photoelectric device 100, and the information of the charge storage 55 may be transferred by the transmission transistor.

A wire (not shown) and a pad (not shown) are formed on the semiconductor substrate 110. In order to decrease signal delay, the wire and pad may be made of a metal having low resistivity, for example, aluminum (Al), copper (Cu), silver (Ag), and alloys thereof, but is not limited thereto. However, it is not limited to the structure, and the wire and pad may be disposed under the photo-sensing devices 50a and 50b.

The lower insulation layer 60 is formed on the wire and the pad. The lower insulation layer 60 may be made of an inorganic insulating material such as a silicon oxide and/or a silicon nitride, or a low dielectric constant (low K) material such as SiC, SiCOH, SiCO, and SiOF. The lower insulation layer 60 has a trench exposing the charge storage 55. The trench may be filled with fillers.

A color filter layer 70 is formed on the lower insulation layer 60. The color filter layer 70 includes a blue filter 70a formed in the blue pixel and a red filter 70b formed in the red pixel. In the present embodiment, a green filter is not included, but a green filter may be further included.

The upper insulation layer 80 is formed on the color filter layer 70. The upper insulation layer 80 eliminates a step caused by the color filter layer 70 and smoothens the surface.

The upper insulation layer 80 and lower insulation layer 60 may include a contact hole (not shown) exposing a pad, and a through-hole 85 exposing the charge storage 55 of a green pixel.

The organic photoelectric device 200 is formed on the upper insulation layer 80. The organic photoelectric device 200 includes a lower electrode 210 and an upper electrode 220 facing each other and an absorbing layer 230 disposed between the lower electrode 210 and the upper electrode 220.

The lower electrode 210 and the upper electrode 220 may be all light-transmitting electrodes and the absorbing layer 230 may selectively absorb light in a green wavelength region and may replace a color filter of a green pixel.

In this way, the semiconductor substrate 110 and the organic photoelectric device 200 selectively absorbing light in a green wavelength region have a stack structure and thereby the size of an image sensor may be reduced to realize a down-sized image sensor.

Focusing lens (not shown) may be further formed on the organic photoelectric device 200. The focusing lens may control a direction of incident light and gather the light in one region. The focusing lens may have a shape of, for example, a cylinder or a hemisphere, but is not limited thereto.

In FIG. 9, a structure where the organic photoelectric device selectively absorbing light in a green wavelength region is stacked on the semiconductor substrate 110 is illustrated, but the present disclosure is not limited thereto. An organic photoelectric device selectively absorbing light in a blue wavelength region may be stacked on the semiconductor substrate 110 and a green photo-sensing device and a red photo-sensing device may be integrated in the semiconductor substrate 110 or an organic photoelectric device selectively absorbing light in a red wavelength region may be stacked on the semiconductor substrate 110 and a green photo-sensing device and a blue photo-sensing device may be integrated in the semiconductor substrate 110.

Among the light in a visible region passing the aforementioned lens barrel 21 and the optical structure 10, light in a green wavelength region may be mainly absorbed in the absorbing layer 230 and photoelectrically converted, and light in a blue wavelength region and a red wavelength region may pass the lower electrode 210 and be sensed by the photo-sensing devices 50a and 50b.

Figure 10:
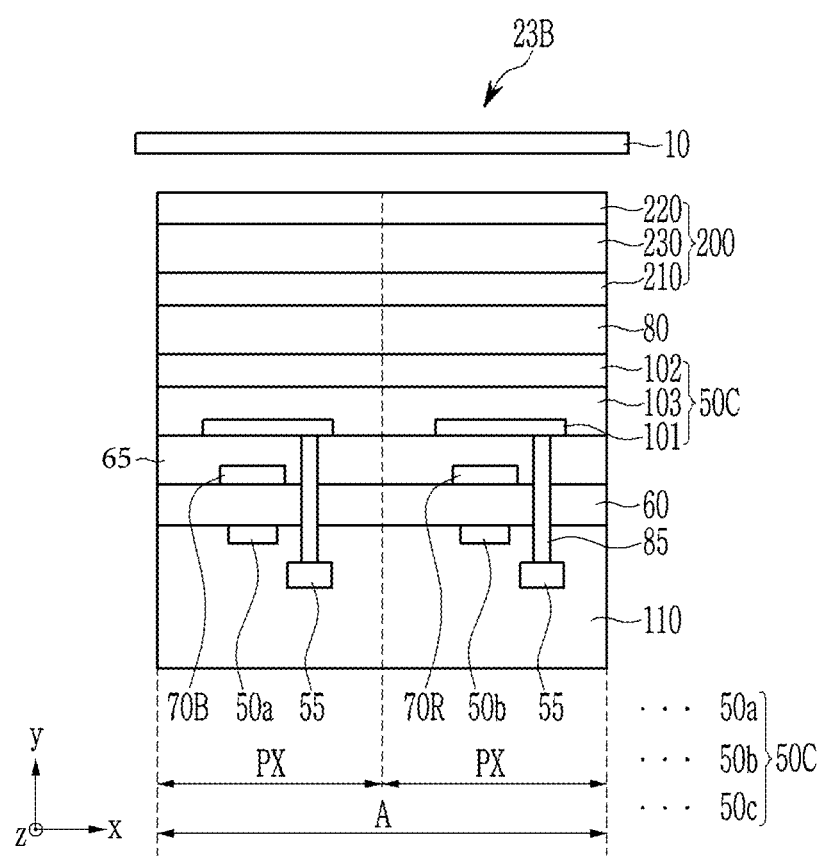
FIG. 10 is a cross-sectional view showing another example of an image sensor.

Referring to FIG. 10, the sensor 23B according to some example embodiments includes the visible light sensor 50, the organic photoelectric device 200, and the optical structure 10 as described above.

Referring to FIG. 10, in the sensor 23B according to some example embodiments, the visible light sensor 50 may be a combination of a photodiode integrated in the semiconductor substrate 110 and a photoelectric device disposed on the semiconductor substrate 110, and the organic photoelectric device 200 may be a separate photoelectric device. In some example embodiments, the same illustration as FIG. 9 will not be repeated, and accordingly, a description of the same constituent elements as those of FIG. 9 will be omitted.

In the semiconductor substrate 110, the blue sensor 50a, the red sensor 50b, the charge storage 55, and a transmission transistor (not shown) are integrated. The blue sensor 50a and the red sensor 50b are photodiodes and spaced apart from each other in a horizontal direction of the semiconductor substrate 110. The blue sensor 50a is integrated in a blue pixel, and the red sensor 50b is integrated in a red pixel.

On the semiconductor substrate 110, the lower insulation layer 60 and the color filter layer 70 are formed. The color filter layer 70 includes a blue filter 70B overlapped with the blue sensor 50a and a red filter 70R overlapped with the red sensor 50b.

An intermediate insulation layer 65 is formed on the color filter layer 70. The lower insulation layer 60 and the intermediate insulation layer 65 may have a through-hole 85 exposing the charge storage 140. The through-hole 85 may be filled with fillers. At least one of the lower insulation layer 60 and intermediate insulation layer 65 may be omitted.

On the intermediate insulation layer 65, the green sensor 50c is formed. The green sensor 50c may be a photoelectric device and formed at the whole surface of the sensor 23E. The green sensor 50c includes a lower electrode 101 and an upper electrode 102 facing each other, and a green light absorption layer 103 between lower electrode 101 and upper electrode 102. One of the lower electrode 101 and the upper electrode 102 is an anode and the other is a cathode.

Both of the lower electrode 101 and the upper electrode 102 may be a light-transmitting electrode, and the light-transmitting electrode may be made of, in some example embodiments, a transparent conductor such as indium tin oxide (ITO) or indium zinc oxide (IZO), or may be a metal thin layer having a thin thickness of several nanometers or several tens of nanometers or a metal thin layer having a thin thickness of several nanometers to several tens of nanometers doped with a metal oxide.

Figure 11:
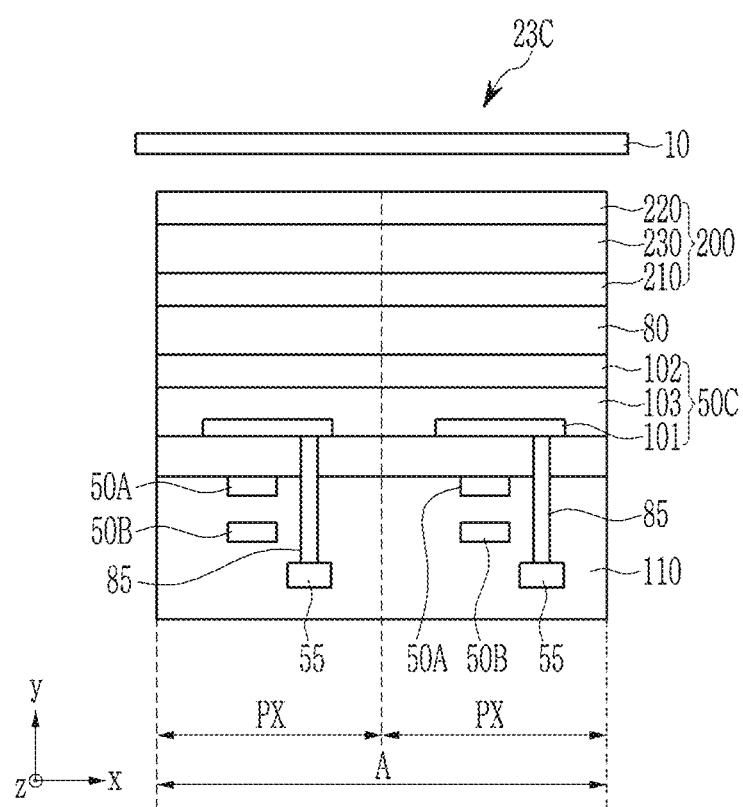
FIG. 11 is a cross-sectional view showing another example of an image sensor.

FIG. 11 is a cross-sectional view that schematically shows another example of a sensor according to some example embodiments.

Referring to FIG. 11, the sensor 23C according to some example embodiments includes the visible light sensor 50, the organic photoelectric device 200, and the optical structure 10 like that of some example embodiments. The visible light sensor 50 includes the blue sensor 50a and the red sensor 50b integrated in the semiconductor substrate 110 and a green sensor 50c disposed on the semiconductor substrate 110, wherein the blue sensor 50a and the red sensor 50b may be photodiodes, and the green sensor 50c may be a photoelectric device. The organic photoelectric device 200 may be a photoelectric device. The green sensor 50c includes a lower electrode 101, a green light absorption layer 103, and an upper electrode 102, and the organic photoelectric device 200 includes a lower electrode 210, a near infra-red absorption layer 230, and an upper electrode 220.

However, in the sensor 23C according to some example embodiments, the blue sensor 50a and the red sensor 50b integrated in the semiconductor substrate 110 are stacked in a vertical direction. The blue sensor 50a and the red sensor 50b may be configured to selectively absorb light in each wavelength region depending on a stacking depth and thus sense it. In other words, the red sensor 50b configured to absorb red light in a long wavelength region is disposed deeper from the surface of the semiconductor substrate 110 than the blue sensor 50a configured to absorb blue light in a short wavelength region. In this way, the color filter layer 70 may be omitted by separating absorption wavelengths depending on the stacking depth.

Figure 12:
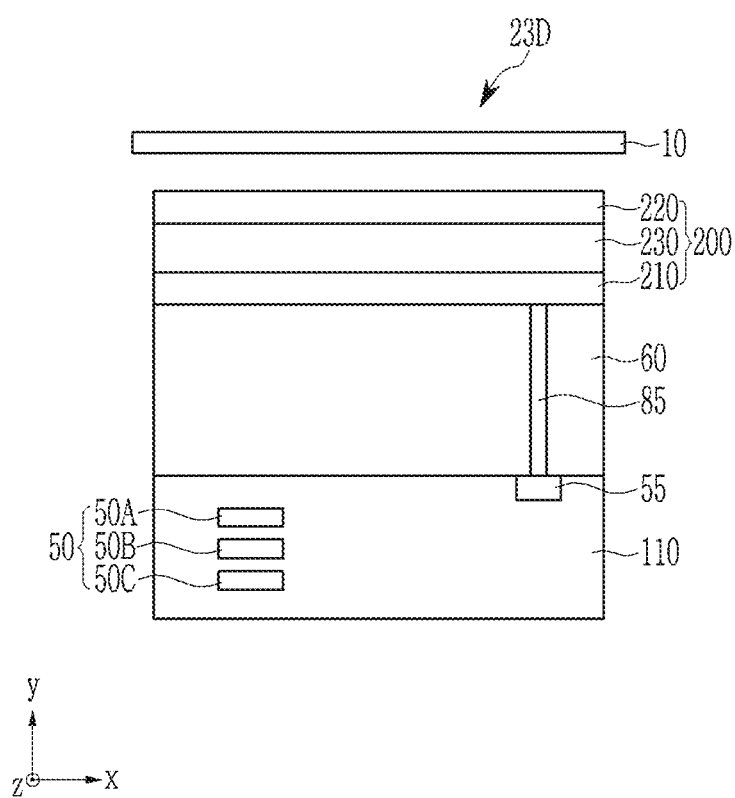
FIG. 12 is a cross-sectional view showing another example of an image sensor.

FIG. 12 is a cross-sectional view that schematically shows another example of a sensor according to some example embodiments.

Referring to FIG. 12, the sensor 23D according to some example embodiments includes the visible light sensor 50, the organic photoelectric device 200, and the optical structure 10 like that of some example embodiments. The visible light sensor 50 includes the blue sensor 50a and the red sensor 50b integrated in the semiconductor substrate 110 and a green sensor 50c disposed on the semiconductor substrate 110, wherein the blue sensor 50a and the red sensor 50b may be photodiodes, and the green sensor 50c may be a photoelectric device. The organic photoelectric device 200 may be a photoelectric device. The green sensor 50c includes a lower electrode 101, a green light absorption layer 103, and an upper electrode 102, and the organic photoelectric device 200 includes a lower electrode 210, a near infra-red absorption layer 230, and an upper electrode 220.

However, in the sensor 23D according to some example embodiments, the blue sensor 50a and the red sensor 50b integrated in the semiconductor substrate 110 are stacked in a vertical direction. The blue sensor 50a and the red sensor 50b may be configured to selectively absorb light in each wavelength region depending on a stacking depth and thus sense it. In other words, the red sensor 50b configured to absorb red light in a long wavelength region is disposed deeper from the surface of the semiconductor substrate 110 than the blue sensor 50a configured to absorb blue light in a short wavelength region. In this way, the color filter layer 70 may be omitted by separating absorption wavelengths depending on the stacking depth.

Figure 13:
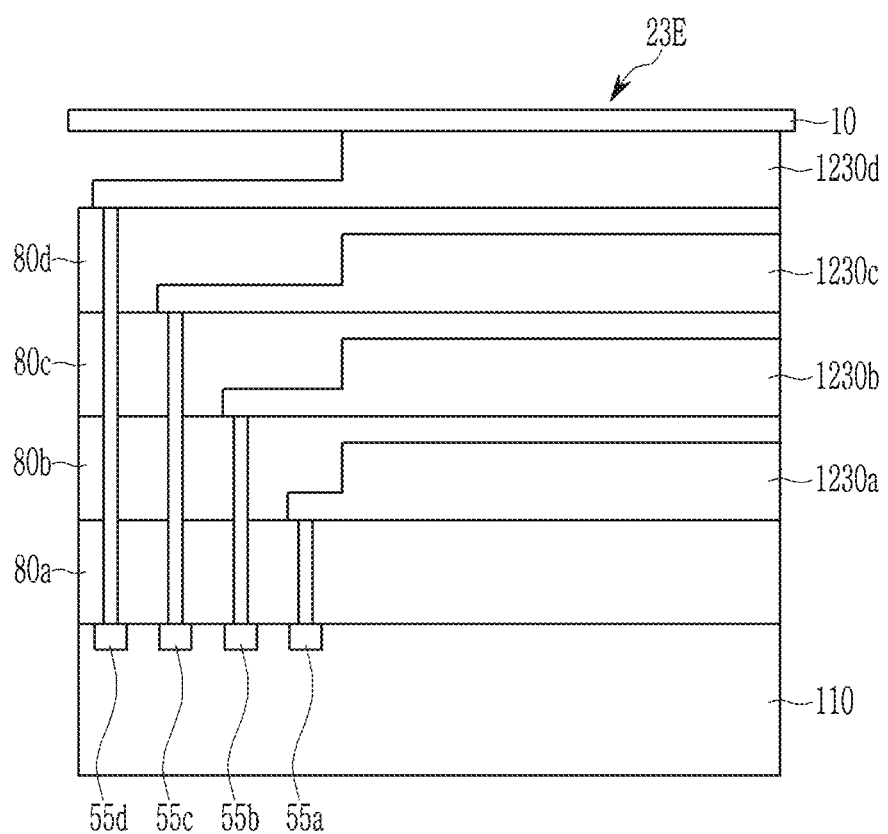
FIG. 13 is a cross-sectional view showing another example of an image sensor.

FIG. 13 is a cross-sectional view showing a sensor 23E according to some example embodiments.

Referring to FIG. 13, the sensor 23E according to some example embodiments includes an optical filter, an infrared/near infrared photoelectric diode configured to selectively absorb light in an infrared/near infrared wavelength spectrum of light, a red photoelectric diode configured to selectively absorb and convert (into electric signals) light in a red wavelength spectrum of incident light, a green photoelectric diode configured to selectively absorb and convert (into electric signals) light in a green wavelength spectrum of incident light, a blue photoelectric diode configured to selectively absorb and convert (into electric signals) light in a blue wavelength spectrum of incident light, and they are stacked in the vertical direction (e.g., Z-direction). Accordingly, it will be understood that, as shown in FIG. 10, the sensor 23E may include a plurality of photoelectric diodes 1200a-1200d that are stacked vertically on the semiconductor substrate 110, such that the plurality of photoelectric diodes 1200a-1200d overlap each other in a direction extending perpendicular to a top surface 110S of the semiconductor substrate 110.

The sensor 23E according to some example embodiments includes a semiconductor substrate 110, a lower insulation layer 80a, an intermediate insulation layer 80b, another intermediate insulation layer 80c, an upper insulation layer 80d, a first photoelectric diode 1200a, a second photoelectric diode 1200b, a third photoelectric diode 1200c, and a fourth photoelectric diode 1200d. As shown, the first to fourth photoelectric diode 1200a to 1200d are stacked vertically on the semiconductor substrate 110, such that the first to fourth photoelectric diode 1200a to 1200d overlap each other in a direction extending perpendicular to a top surface 110S of the semiconductor substrate 110.

The semiconductor substrate 110 may be a silicon substrate, and is integrated with the transmission transistor (not shown) and charge storages.

The first photoelectric diode 1200a is formed on the lower insulation layer 80a. The first photoelectric diode 1200a includes a photoelectric conversion layer 1230a. The first photoelectric diode 1200a may be any one of the photoelectric diodes described herein with reference to FIGS. 9-13. The photoelectric conversion layer 1230a may selectively absorb and convert (into electric signals) light in one of infrared, red, blue, and green wavelength spectra of incident light. For example, the first photoelectric diode 1200a may be a blue photoelectric diode.

An intermediate insulation layer 80b is formed on the first photoelectric diode 1200a.

The second photoelectric diode 1200b is formed on the intermediate insulation layer 80b. The second photoelectric 1200b includes a photoelectric conversion layer 1230b. The second photoelectric diode 1200b may be any one of the photoelectric diodes described herein with reference to FIGS. 9-13. The photoelectric conversion layer 1230b may selectively absorb and convert (into electric signals) light in one of infrared, red, blue, and green wavelength spectra of incident light. For example, the second photoelectric diode 1200b may be a green photoelectric diode.

Another intermediate insulation layer 80c is formed on the second photoelectric diode 1200b.

The third photoelectric diode 1200c is formed on the intermediate insulation layer 80c. The third photoelectric diode 1200c includes a photoelectric conversion layer 1230c. The third photoelectric diode 1200c may be any one of the photoelectric diodes described herein with reference to FIGS. 9-13. The photoelectric conversion layer 1230c may selectively absorb and convert (into electric signals) light in one of infrared, red, blue, and green wavelength spectra of incident light. For example, the third photoelectric diode 1200c may be a red photoelectric diode.

The upper insulation layer 80d is formed on the third photoelectric diode 1200c.

The lower insulation layer 80a, the intermediate insulation layers 80b and 80c, and the upper insulation layer 80d have a plurality of through-holes exposing the charge storages 55a, 55b, 55c, and 55d.

The fourth photoelectric diode 1200d is formed on the upper insulation layer 80d. The fourth photoelectric diode 1200d includes a photoelectric conversion layer 1230d. The fourth photoelectric diode 1200d may be any one of the photoelectric diodes described herein with reference to FIGS. 9-13. The photoelectric conversion layer 1230d may selectively absorb light in one of infrared, red, blue, and green wavelength spectra of light. For example, the fourth photoelectric diode 1200d may be an infrared/near infrared photoelectric diode.

As shown, an optical structure 10 may be on the fourth photoelectric diode 1200d.

In the drawing, the first photoelectric diode 1200a, the second photoelectric diode 1200b, the third photoelectric diode 1200c, and the fourth photoelectric diode 1200d are sequentially stacked, but the present disclosure is not limited thereto, and they may be stacked in various orders.

As described above, the first photoelectric diode 1200a, the second photoelectric diode 1200b, the third photoelectric diode 1200c, and the fourth photoelectric diode 1200d have a stack structure, and thus the size of an image sensor may be reduced to realize a down-sized image sensor.

Figure 14:
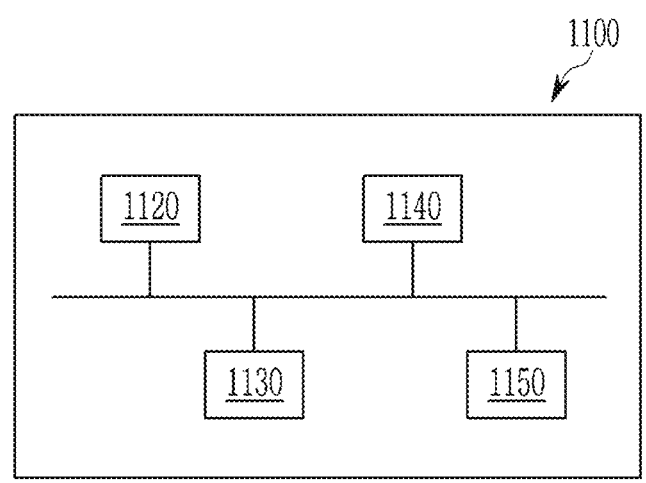

FIG. 14 is a schematic diagram of an electronic device 1300 according to some example embodiments.

As shown in FIG. 14, an electronic device 150 may include a processor 1120, a memory 1130, image sensor device 1140, and display device 1150 that are electrically coupled together via a bus 1110. The image sensor device 1140 may include any of the sensors 23 of any of the example embodiments as described herein. The memory 1130, which may be a non-transitory computer readable medium, may store a program of instructions. The processor 1120 may execute the stored program of instructions to perform one or more functions. The processor 1120 may further may execute the stored program of instructions to display the generated image on display device 1150. The processor 1120 may be configured to generate an output (e.g., an image to be displayed on the display device 1150).

As described above, the optical structure 10 has improved near-infrared absorbance and low visible absorbance in various environments such as a high temperature/high humidity environment and the like and thereby may transfer light in a pure visible region to an image sensor and resultantly, reduce or prevent a crosstalk generated when a signal by light in a visible region is crossed and mixed with a signal by light in a non-visible region. Accordingly, a camera module and an electronic device including the optical structure 10 may minimize an optical distortion phenomenon of the image sensor for example due to a used environment such as a high humidity environment and the like, and may obtain a clear image.

Hereinafter, the embodiments are illustrated in more detail with reference to examples. However, these examples are exemplary, and the present scope is not limited thereto.

Manufacture of Optical Structure

Example 1

55.2 parts by weight of copper complex represented by Chemical Formula 1-1, 27.6 parts by weight of acryl-based cross-linking monomer (manufactured by Sigma-Aldrich Corporation, trimethylolpropane triacrylate), 6.9 parts by weight of epoxy-based cross-linking monomer (manufactured by DAICEL, EHPE-3150), 5.2 parts by weight of N,N-(dimethylaminoethyl)methacrylate (Sigma-Aldrich Corporation), and 5.6 parts by weight of diisopropylethyl-amine (Sigma-Aldrich Corporation, DIPEA) are dissolved into tetrahydrofuran (Sigma-Aldrich Corporation) until reaching 66 wt %. Subsequently, a photoinitiator (manufactured by BASF, IRGACURE®184) is further added in 3 parts by weight based on 100 parts by weight of solids of the solution to prepare a copper complex-containing near-infrared absorption composition.

[Chemical Formula 1-1]

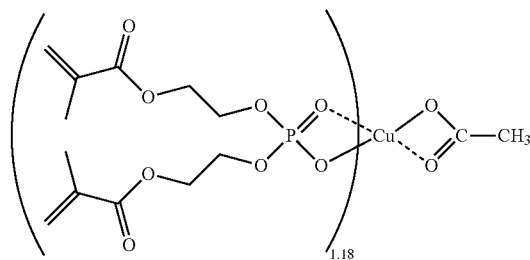

A composition in which a thermosetting acryl-based compound is dissolved in butylacetate is coated in a thickness of 2 μm on cycloolefin copolymer transparent substrate (ZEON Corporation, COC, a water vapor transmission rate at a thickness of 100 μm: 0.2 g/m²/day, and a saturated absorption rate: less than 0.01%) having a thickness of about 100 μm and then dried in a drying oven at 85° C. for 5 minutes to provide a primer layer. Subsequently, the copper complex-containing near-infrared absorption composition is coated on the obtained primer layer in a thickness of about 100 μm and dried in a drying oven at 65° C. for 5 minutes and then cured by a photo-curing with a UV light dose of about 3000 mJ to provide a first near-infrared absorbing layer.

Then an urethane acrylate adhesive (DIC Co., Ltd., ERS-698) is coated on the first near-infrared absorbing layer in a thickness of about 2 μm and dried in a drying oven at 85° C. for 5 minutes and cured by performing a photo-curing with a UV light dose of about 3000 mJ. A cycloolefin copolymer resin (TOPAS Inc., COC, a water vapor transmission rate at a thickness of 100 μm: 0.2 g/m²/day, and a saturated absorption rate: less than 0.01%) is coated thereon in a thickness of about 5 μm and dried in a drying oven at 80° C. for 5 minutes to provide an optical structure that transparent substrate (COC)/primer layer (acryl-based)/first near-infrared absorbing layer (Chemical Formula 1-1)/interface adhesive layer (urethane acrylate)/first moisture-proof layer (COC) are sequentially stacked.

Example 2

A composition in which a thermosetting acryl-based compound is dissolved in butylacetate is coated in a thickness of about 2 μm on a cycloolefin copolymer transparent substrate (ZEON Corporation, COC, a water vapor transmission rate at a thickness of 100 μm: 0.2 g/m²/day, and a saturated absorption rate: less than 0.01%) having a thickness of about 100 μm and dried in a drying oven at 85° C. for 5 minutes to provide a primer layer.

Then the copper complex-containing near-infrared absorption composition obtained from Example 1 is coated on the obtained primer layer in a thickness of about 100 μm and dried in a drying oven at 65° C. for 5 minutes.

Subsequently, about 5 μm-thick polycarbonate (PC) resin (LG Chem Ltd., LUPOY, a water vapor transmission rate at a thickness of: 50 g/m²/day, and a saturated absorption rate: 0.2%) film formed on a releasing PET film is disposed on the dried near-infrared absorption composition, and then the polycarbonate film layer and the near-infrared absorption composition layer are compressed at a room temperature under a pressure of 0.3 MPa. Then the near-infrared absorbing layer is cured by performing a photo-curing with a UV light dose of about 3000 mJ, and the releasing PET film is removed to provide an optical structure that transparent substrate (COC)/primer layer (acryl-based)/first near-infrared absorbing layer (Chemical Formula 1-1)/first moisture-proof layer (PC) are sequentially stacked.

Example 3

An optical structure that transparent substrate (COC)/primer layer (acryl-based)/first near-infrared absorbing layer (Chemical Formula 1-1)/first moisture-proof layer (COC) are sequentially stacked is obtained in accordance with the same procedure as in Example 2, except that about 5 μm-thick cycloolefin copolymer resin (TOPAS Inc., COC, a water vapor transmission rate at a thickness of 100 μm: 0.2 g/m²/day, and a saturated absorption rate: less than 0.01%) film is disposed instead of the about 5 μm-thick polycarbonate resin film.

Example 4

In addition to the copper complex-containing near-infrared absorption composition according to Example 1, an organic dye-containing near-infrared absorption composition is prepared.

In the organic dye-containing near-infrared absorption composition, 35 mg of an organic dye represented by Chemical Formula 2-1 and 35 mg of an organic dye represented by Chemical Formula 2-2, 10 mg of an antioxidant (BASF, Irganox-1010), and 1 g of a polycarbonate (PC) binder (LG Chem Ltd., LUPOY) are dissolved in 8 g of chloroform.

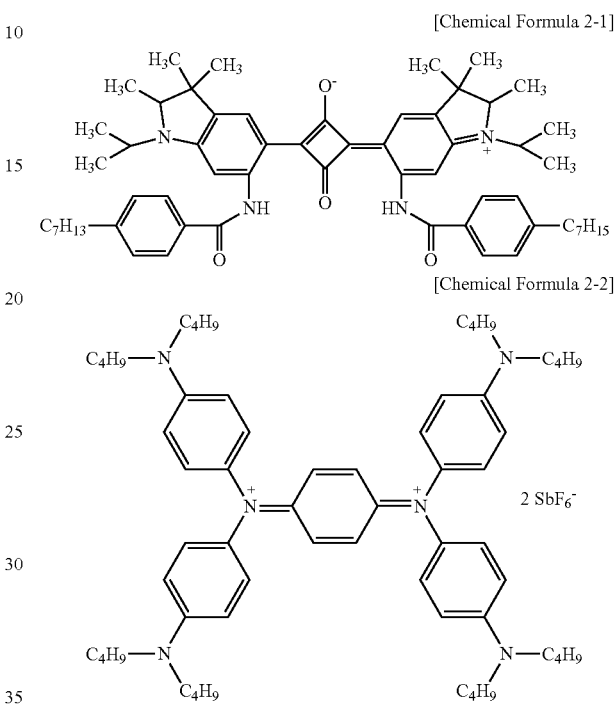

[Chemical Formula 2-1]

[Chemical Formula 2-2]

The organic dye-containing near-infrared absorption composition is coated on a lower surface of a transparent substrate of the optical structure obtained from Example 3 in a thickness of about 3 μm, and then dried in an drying oven at 65° C. for 3 minutes and cured to provide an optical structure that second near-infrared absorbing layer (Chemical Formula 2-1+Chemical Formula 2-2+PC)/transparent substrate (COC)/primer layer (acryl-based)/first near-infrared absorbing layer (Chemical Formula 1-1)/first moisture-proof layer (COC) are sequentially stacked.

Example 5

A polycarbonate resin (LG Chem Ltd., LUPOY, a water vapor transmission rate at a thickness of 100 μm: 50 g/m²/day, and a saturated absorption rate: 0.2%) film having a thickness of about 5 μm formed on a releasing PET film is disposed on a lower surface of the second near-infrared absorbing layer obtained from Example 4, and then the polycarbonate (PC) film layer and the near-infrared absorption composition layer are compressed at a room temperature under a pressure of 0.3 MPa to provide an optical structure that second moisture-proof layer (PC)/second near-infrared absorbing layer (Chemical Formula 2-1+Chemical Formula 2-2+PC)/transparent substrate (COC)/primer layer (acryl-based)/first near-infrared absorbing layer (Chemical Formula 1-1)/first moisture-proof layer (COC) are sequentially stacked.

Example 6

A pressure-sensitive adhesive (manufactured by SDI) is coated on a lower surface of the transparent substrate of the optical structure obtained from Example 3 in a thickness of about 35 μm, and then the organic dye-containing near-infrared absorption composition obtained from Example 4 is coated thereon and dried in a drying oven at 65° C. for 3 minutes and cured to provide an optical structure that a second near-infrared absorbing layer(Chemical Formula 2-1+Chemical Formula 2-2+PC)/interface adhesive layer (PSA)/transparent substrate (COC)/primer layer (acryl-based)/first near-infrared absorbing layer (Chemical Formula 1-1)/first moisture-proof layer (COC) are sequentially stacked.

Example 7

An optical structure that second near-infrared absorbing layer(Chemical Formula 2-1+Chemical Formula 2-2+acryl binder)/transparent substrate (COC)/primer layer (acryl-based)/first near-infrared absorbing layer (Chemical Formula 1-1)/first moisture-proof layer (COC) are sequentially stacked is obtained in accordance with the same procedure as in Example 4, except that an acryl binder (manufactured by SOKEN, GS-80ES) is used instead of polycarbonate(PC) binder (LG Chem Ltd., LUPOY) in the organic dye-containing near-infrared absorption composition prepared in Example 4.

Example 8

An optical structure that second near-infrared absorbing layer (Chemical Formula 2-1+Chemical Formula 2-3+COC)/transparent substrate (COC)/primer layer (acryl-based)/first near-infrared absorbing layer (Chemical Formula 1-1)/first moisture-proof layer (COC) are sequentially stacked is obtained in accordance with the same procedure as in Example 4, except that 35 mg of organic dye represented by Chemical Formula 2-3 is used instead of 35 mg of organic dye represented by Chemical Formula 2-2 in the organic dye-containing near-infrared absorption composition prepared from Example 4, and a cycloolefin polymer (COC) binder (manufactured by JSR, ARTON RX4500) is used instead of the polycarbonate (PC) binder (LG Chem Ltd., LUPOY).

[Chemical Formula 2-3]

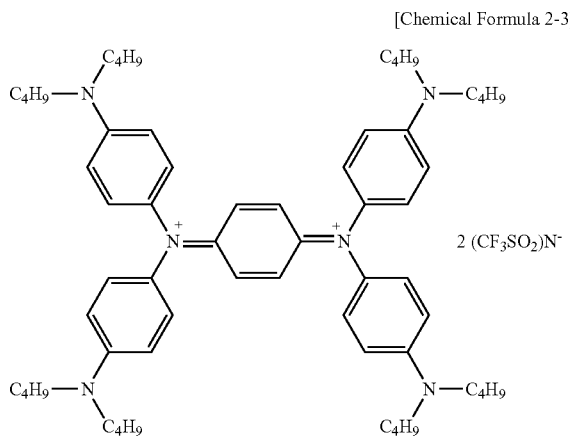

Example 9

An optical structure that second near-infrared absorbing layer (Chemical Formula 2-1+Chemical Formula 2-3+COC)/transparent substrate (COC)/primer layer (acryl-based)/first near-infrared absorbing layer (Chemical Formula 1-1)/first moisture-proof layer (COC) are sequentially stacked is obtained in accordance with the same procedure as in Example 8, except that a cycloolefin polymer (COC) binder {manufactured by SIGMA-ALDRICH, Poly[[octahydro-5-(methoxycarbonyl)-5-methyl-4,7-methano-1H-indene-1,3-diyl]-1,2-ethanediyl]} is used instead of the polycarbonate (PC) binder (LG Chem Ltd., LUPOY) in the organic dye-containing near-infrared absorption composition prepared from Example 4.

Example 10

A composition in which a thermosetting acryl-based compound is dissolved in butylacetate is coated in a thickness of about 2 μm on a cycloolefin copolymer (COC) transparent substrate (ZEON Corporation, COC, a water vapor transmission rate at a thickness of 100 μm: 0.2 g/m$^2$/day, and a saturated absorption rate: less than 0.01%) having a thickness of about 100 μm and then dried in a drying oven at 85° C. for 5 minutes to provide a primer layer. Subsequently, the copper complex-containing near-infrared absorption composition obtained from Example 1 is coated on the obtained primer layer in a thickness of about 100 μm, dried in a drying oven at 65° C. for 5 minutes and cured by performing a photo curing with a UV light dose of about 3000 mJ to provide a first near-infrared absorbing layer.

Subsequently, a urethane acrylate adhesive (DIC Co., Ltd., ERS-698) is coated in a thickness of about 2 μm on the first near-infrared absorbing layer, dried in a drying oven at 85° C. for 5 minutes, and then is cured by performing light curing with a UV light dose of about 3000 mJ. The organic dye-containing near-infrared absorption composition prepared from Example 4 is coated thereon in a thickness of about 3 μm and then dried in a drying oven at 65° C. for 3 minutes.

Subsequently, a cycloolefin copolymer binder (TOPAS Inc., COC, a water vapor transmission rate at a thickness of 100 μm: 0.2 g/m$^2$/day, and a saturated absorption rate: less than 0.01%) is coated thereon in a thickness of about 5 μm and dried in a drying oven at 80° C. for 10 minutes to provide an optical structure that transparent substrate (COC)/primer layer (acryl-based)/first near-infrared absorbing layer (Chemical Formula 1-1)/interface adhesive layer (urethane acrylate)/second near-infrared absorbing layer (Chemical Formula 1-1+Chemical Formula 2-1+PC)/first moisture-proof layer (COC) are sequentially stacked.

Comparative Example 1

A copper complex-containing near-infrared absorption composition is prepared in accordance with the same procedure as in Example 1, except that a copper complex represented by Chemical Formula 1-A is used instead of the copper complex represented by Chemical Formula 1-1.

[Chemical Formula 1-A]

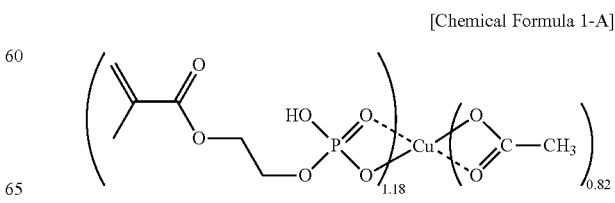

A composition in which a thermosetting acryl-based compound is dissolved in butylacetate is coated in a thickness of about 2 μm on a cycloolefin copolymer transparent substrate (ZEON Corporation, COC, a water vapor transmission rate at a thickness of 100 μm: 0.2 g/m2/day, and a saturated absorption rate: less than 0.01%) having a thickness of about 100 μm and then dried in a drying oven at 85° C. for 5 minutes to provide a primer layer. Subsequently, the copper complex-containing near-infrared absorption composition is coated in a thickness of about 100 μm on the obtained primer layer and dried in a drying oven at 65° C. for 5 minutes and cured by performing photo curing with a UV light dose of about 3000 mJ to provide an optical structure that transparent substrate (COC)/primer layer (acryl-based)/first near-infrared absorbing layer (Chemical Formula 1-A) are sequentially stacked.

Comparative Example 2

An optical structure that transparent substrate (COC)/primer layer (acryl-based)/first near-infrared absorbing layer (Chemical Formula 1-1) are sequentially stacked is obtained in accordance with the same procedure as in Example 1, except omitting the processes of providing an interface adhesive layer and a first moisture-proof layer from Example 1.

Comparative Example 3

An optical structure that transparent substrate (COC)/primer layer (acryl-based)/first near-infrared absorbing layer (Chemical Formula 1-1)/overcoating layer (polysulfone) are sequentially stacked is obtained in accordance with the same procedure as in Example 2, except that a polysulfone resin (Solvay, Udel PSU, Tg=190° C., a water vapor transmission rate at a thickness of 100 μm: 130 g/m²/day, and a saturated absorption rate: 0.3%) film having a thickness of about 5 μm formed on a releasing PET film is used instead of the polycarbonate resin (LG Chem Ltd., LUPOY) film having a thickness of about 5 μm from Example 2.

Comparative Example 4

The copper complex-containing near-infrared absorption composition obtained from Comparative Example 1 is coated in a thickness of about 100 μm on a cycloolefin copolymer transparent substrate (ZEON Corporation, COC, a water vapor transmission rate at a thickness of 100 μm: 0.2 g/m²/day, and a saturated absorption rate: less than 0.01%) having a thickness of 100 μm and dried in a drying oven at 65° C. for 5 minutes and then cured by performing a photo curing with a UV light dose of about 3000 mJ to provide an optical structure that transparent substrate (COC)/first near-infrared absorbing layer (Chemical Formula 1-A) are sequentially stacked.

Evaluation: Optical Properties and Hygroscopic Resistance of Optical Structures According to Examples and Comparative Examples For the optical structures according to Examples 1 to 10 and Comparative Examples 1 to 4, each light transmittance graph according to a wavelength is calculated using a UV-Vis spectrophotometer (SolidSpec-3700, manufactured by Shimadzu).

Subsequently, the optical structures according to Examples and Comparative Examples are introduced into a high temperature hygroscopic chamber (ARS-0220-AE, manufactured by ESPEC Corp) and allowed to stand for 120 hours under conditions of a temperature of 80° C. and a relative humidity of 85 RH %. Subsequently, the optical structures according to Examples and Comparative Examples exposed to the high temperature/high humidity environment are evaluated for high temperature/high humidity properties using a UV-Vis spectrophotometer (SolidSpec-3700, manufactured by Shimadzu), and each light transmittance graph according to a wavelength is calculated. Then from the calculated graphs, changes of average light transmittances (Δ, absolute value, unit: %) before/after the high temperature/high humidity evaluation according to a wavelength region of 435 nm to 565 nm and each near-infrared wavelength region are summarized and shown Table 1.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 | Comp. Ex. 4 |
|---|---|---|---|---|---|---|---|---|---|---|---|---|---|---|
| Δ [%] (@435 nm-565 nm) | 5.2 | 3.0 | 2.8 | 1.5 | 2.1 | 2.7 | 2.6 | 5.5 | 2.7 | 6.7 | 31.4 | 19.4 | 8.1 | 41.1 |
| Δ [%] (@850 nm-950 nm) | 2.6 | 1.4 | 2.4 | 0.1 | 0.5 | 0.4 | 0.9 | 1.1 | 0.8 | 2.1 | 1.5 | 0.1 | 2.0 | 16.3 |
| Δ [%] (@950 nm-1100 nm) | 2.2 | 0.2 | 1.8 | 0.1 | 0.0 | 0.5 | 1.4 | 0.8 | 0.8 | 1.3 | 4.0 | 2.3 | 4.8 | 24.3 |
| Δ [%] (@1100 nm-1200 nm) | 0.9 | 1.2 | 0.5 | 0.1 | 0.3 | 0.2 | 1.5 | 0.3 | 1.0 | 0.1 | 6.9 | 4.9 | 7.2 | 21.6 |

Meanwhile, graphs corresponding to Examples 3 (FIG. 15) and 9 (FIG. 16) and Comparative Example 2 (FIG. 17) are shown in FIGS. 15 to 17, respectively.

FIGS. 15 to 17 are graphs showing absorbance depending on a wavelength of the optical structure before and after the high temperature/high humidity: FIG. 15 shows the result of Example 3, FIG. 16 shows the result of Example 9, and FIG. 17 shows the result of Comparative Example 2.

Referring to Table 1 and FIG. 15 to FIG. 17, it is confirmed that the optical structures according to Examples are formed with a first moisture-proof layer including a first organic material having moisture-proof properties, so the optical properties thereof are insignificantly deteriorated even if being exposed to the high temperature/high humidity environment. Specifically, it is confirmed that the optical structures according to Examples show that changes of the average light transmittances before/after the high temperature/high humidity evaluation in a wavelength region of 435 nm to 535 nm are less than or equal to 8%, and changes of the average light transmittances before/after the high temperature/high humidity evaluation in the entire region of a near-infrared wavelength (850 nm to 1200 nm) is less than or equal to 3%, which is very excellent.

Furthermore, as shown in FIGS. 15 to 17, the optical structures according to Examples show excellent optical properties regardless before/after the high temperature/high humidity evaluation, but the optical structures according to Comparative Examples show significantly deteriorated optical properties before/after the high temperature/high humidity evaluation.

On the other hand, in Comparative Examples, it is confirmed that changes of the average light transmittances before/after high temperature/high humidity evaluation in a wavelength region of 435 nm to 535 nm are greater than 8% (Comparative Example 2, Comparative Example 3), or changes of the average light transmittances before/after high temperature/high humidity evaluation in the entire wavelength region of a near-infrared ray (850 nm to 1200 nm) are all greater than 3%.

Meanwhile, Comparative Examples 1, 2, and 4 show significantly high changes of light transmittances before/after high temperature/high humidity evaluation, particularly as Comparative Example 4 generate a lot of haze after the high temperature/high humidity evaluation, so as not to ensure a transparency above the predetermined level, so that it may be not applied for an optical structure.

Meanwhile, from the results of Comparative Examples 1 and 2, it is confirmed that the case that the copper complex does not include hydroxyl group (Comparative Example 2) shows lower changes of the average light transmittances before and after the high temperature/high humidity evaluation than in the case including the same.

Meanwhile, from the results of Comparative Examples 1 and 4, it is confirmed that the case (Comparative Example 1) that a primer layer (acryl-based) for improving the interface adherence is included between the transparent substrate (COC) layer and the first near-infrared absorbing layer (Chemical Formula 1-1) shows improved changes of the average light transmittances before and after the high temperature/high humidity evaluation, compared to the case not including the same (Comparative Example 4).

Therefore, from the results of FIGS. 15 to 17 and Table 1, it is confirmed that the optical structures according to Examples show excellent optical properties and hygroscopic resistance by including the moisture-proof layer, compared to the opposite cases.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. An optical structure, comprising:
a first moisture-proof layer including a first organic material having moisture-proof properties; and
a first near-infrared absorbing layer disposed on the first moisture-proof layer, the first near-infrared absorbing layer including a copper complex,
wherein the first organic material having moisture-proof properties has a water vapor transmission rate (WVTR) of less than or equal to about 100 g/m²/day measured at a thickness of 100 μm, and
wherein the copper complex is represented by Chemical Formula 1:

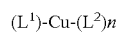

[Chemical Formula 1]

wherein, in Chemical Formula 1,
$L^1$ is a ligand represented by Chemical Formula A,
$L^2$ is a ligand selected from at least one of a substituted or unsubstituted phosphate group, a substituted or unsubstituted phosphonate group, a substituted or unsubstituted sulfate group, or a substituted or unsubstituted sulfonate group (wherein $L^2$ does not include a hydroxyl group (—OH)), and
n is 1 to 4,

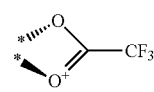

[Chemical Formula A]

wherein, in Chemical Formula A,
* is a linking point with Cu.

2. The optical structure of claim 1 further comprising:
a transparent substrate disposed under the first moisture-proof layer; and
the first near-infrared absorbing layer disposed between the transparent substrate and the first moisture-proof layer.

3. The optical structure of claim 1, wherein the first organic material having moisture-proof properties has a saturated absorption rate of less than or equal to about 0.25%.

4. The optical structure of claim 1, wherein the first organic material having moisture-proof properties comprises a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), polymethylmetacrylate (PMMA), a derivative thereof, or a combination thereof.

5. The optical structure of claim 1, wherein the first moisture-proof layer is in direct contact with the first near-infrared absorbing layer.

6. The optical structure of claim 1, wherein the first organic material having moisture-proof properties comprises a cross-linking polymerization product.

7. The optical structure of claim 2, wherein the transparent substrate comprises polyethylene terephthalate (PET), polyethylene naphthalate (PEN), triacetyl cellulose (TAC), polyimide (PI), cycloolefin copolymer (COC), polybutylene succinate (PBS), polycarbonate (PC), polyetherimide (PEI), perfluoroalkoxy alkanes (PFA), polystyrene (PS), polymethylmetacrylate (PMMA), a derivative thereof, or a combination thereof.

8. The optical structure of claim 7, wherein the $L^2$ comprises a ligand represented by Chemical Formula B:

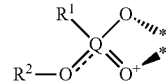

[Chemical Formula B]

wherein, in Chemical Formula B,

Q is S or P,

R$^1$ and R$^2$ are each independently one of hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, —OR$^{b1}$, —C(=O)R$^{b2}$, —OC(=O)R$^{b3}$ (wherein R$^{b1}$, R$^{b2}$, and R$^{b3}$ are each independently one of hydrogen, a substituted or unsubstituted C1 to C20 alkyl group, a substituted or unsubstituted C2 to C20 alkenyl group, a substituted or unsubstituted C6 to C20 aryl group, and a substituted or unsubstituted C3 to C20 heteroaryl group) and a functional group represented by Chemical Formula X (wherein R$^1$, R$^2$, R$^{b1}$, R$^{b2}$, and R$^{b3}$ do not include a hydroxyl group), and

* is a linking point with Cu,

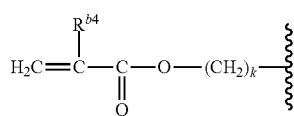

[Chemical Formula X]

wherein, in Chemical Formula X,

R$^{b4}$ is at least one of hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group (wherein that R$^{b4}$ does not include a hydroxyl group), and k is an integer ranging from 0 to 8.

9. The optical structure of claim 2, wherein a second near-infrared absorbing layer is further included at between the transparent substrate and the first moisture-proof layer, on other surfaces of the transparent substrate, or a combination thereof.

10. The optical structure of claim 9, wherein the second near-infrared absorbing layer comprises an organic dye and an organic binder having moisture-proof properties.

11. The optical structure of claim 10, wherein the organic dye comprises a polymethine compound, a phthalocyanine compound, a merocyanine compound, a naphthalocyanine compound, an immonium compound, diimmonium compound, a triarylmethane compound, a dipyrromethene compound, an anthraquinone compound, naphthoquinone, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof.

12. The optical structure of claim 10, wherein the organic binder having moisture-proof properties comprises a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), a derivative thereof, or a combination thereof.

13. The optical structure of claim 9, wherein
the optical structure further comprises a second moisture-proof layer comprising a second organic material having moisture-proof properties
the second near-infrared absorbing layer is disposed on the other surface of the transparent substrate, and the second moisture-proof layer is disposed to face the transparent substrate while the second near-infrared absorbing layer is disposed there between.

14. The optical structure of claim 13, wherein the second organic material having moisture-proof properties has a water vapor transmission rate (WVTR) of less than or equal to about 100 g/m$^2$/day measured at a thickness of 100 μm and a saturated absorption rate of less than or equal to about 0.25%.

15. The optical structure of claim 13, wherein the second organic material comprises a cycloolefin copolymer (COC), polybutylene succinate (PBS), polycarbonate (PC), polyetherimide (PEI), polyethylene terephthalate (PET), polyethylene naphthalate (PEN), perfluoroalkoxy alkanes (PFA), polystyrene (PS), a derivative thereof, or a combination thereof.

16. The optical structure of claim 2, wherein an infrared reflection layer is further included on at least one of one surface of the transparent substrate and one surface of the first moisture-proof layer.

17. The optical structure of claim 1, wherein the first moisture-proof layer protects the optical structure such that, after being placed at a temperature of 80° C. under relative humidity of 85 RH % for 120 hours, the optical structure exhibits a change of an average light transmittance of less than or equal to about 8% in a wavelength region of about 430 nm to about 565 nm.

18. The optical structure of claim 1, wherein the first moisture-proof layer protects the optical structure such that, after being placed at a temperature of 80° C. under relative humidity of 85 RH % for 120 hours, the optical structure exhibits a change of an average light transmittance of less than or equal to about 3% in a wavelength region of about 850 nm to about 1200 nm.

19. A camera module comprising:
a lens;
an image sensor; and
the optical structure of claim 1 disposed between the lens and the image sensor.

20. An electronic device comprising:
the optical structure of claim 1.

* * * * *